United States Patent
Ezra et al.

(10) Patent No.: US 9,146,877 B2
(45) Date of Patent: Sep. 29, 2015

(54) STORAGE SYSTEM CAPABLE OF MANAGING A PLURALITY OF SNAPSHOT FAMILIES AND METHOD OF SNAPSHOT FAMILY BASED READ

(71) Applicant: Infinidat LTD., Herzliya (IL)

(72) Inventors: Josef Ezra, Even Yehuda (IL); Yechiel Yochai, Moshav Aviel (IL); Ido Ben Tsion, Ness-Ziona (IL); Efraim Zeidner, Haifa (IL)

(73) Assignee: INFINIDAT LTD., Herzliya (IL)

( * ) Notice: Subject to any disclaimer, the term of this patent is extended or adjusted under 35 U.S.C. 154(b) by 104 days.

(21) Appl. No.: 14/198,632

(22) Filed: Mar. 6, 2014

(65) Prior Publication Data

US 2014/0244935 A1 Aug. 28, 2014

Related U.S. Application Data

(63) Continuation-in-part of application No. 14/092,169, filed on Nov. 27, 2013.

(60) Provisional application No. 61/730,988, filed on Nov. 29, 2012.

(51) Int. Cl.
*G06F 13/00* (2006.01)
*G06F 12/08* (2006.01)
*G06F 3/06* (2006.01)
*G06F 11/14* (2006.01)

(52) U.S. Cl.
CPC ............ *G06F 12/0875* (2013.01); *G06F 3/065* (2013.01); *G06F 3/0614* (2013.01); *G06F 3/0689* (2013.01); *G06F 11/1458* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 4,864,497 A | * | 9/1989 | Lowry et al. | 1/1 |
| 5,553,266 A | * | 9/1996 | Metzger et al. | 711/144 |
| 6,353,836 B1 | * | 3/2002 | Bamford et al. | 1/1 |
| 7,600,098 B1 | * | 10/2009 | Chou | 712/216 |
| 8,019,944 B1 | * | 9/2011 | Favor et al. | 711/118 |
| 8,706,705 B1 | * | 4/2014 | Warrington | 707/695 |
| 9,021,087 B1 | * | 4/2015 | Weng et al. | 709/224 |
| 2002/0069341 A1 | * | 6/2002 | Chauvel et al. | 711/207 |
| 2002/0073282 A1 | * | 6/2002 | Chauvel et al. | 711/122 |
| 2014/0089264 A1 | * | 3/2014 | Talagala et al. | 707/649 |

* cited by examiner

*Primary Examiner* — Sean D Rossiter
(74) *Attorney, Agent, or Firm* — Reches Patents

(57) ABSTRACT

A method for a snapshot family based reading of data units from a storage system, the method comprises: receiving a read request for reading a requested data entity, searching in a cache memory of the storage system for a matching cached data entity, if not finding the matching cached data entity then: searching for one or more relevant data entity candidates stored in the storage system; selecting, out of the one or more relevant data entity candidates, a selected relevant data entity that has a content that has a highest probability, out of contents of the one or more relevant data entity candidates, to be equal to the content of the requested data entity; and responding to the read request by sending the selected relevant data entity.

21 Claims, 24 Drawing Sheets

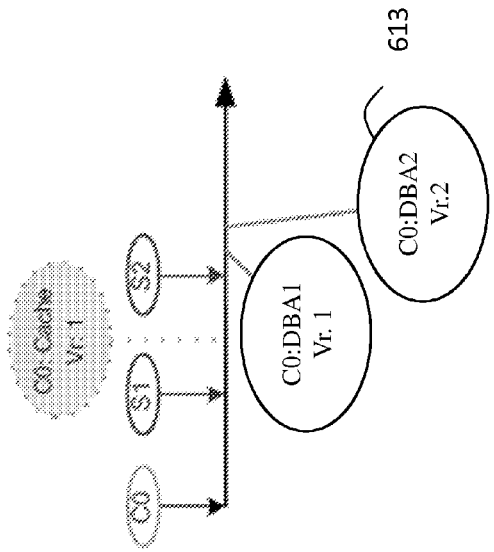
Timeline of Events (602-3)
MVE (605-3)
| SnapID | C0 | S2 | S1 |
|---|---|---|---|
| DBA | DBA2 | DBA1 | Pass |
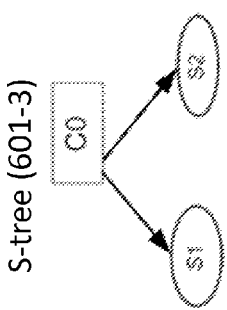
S-tree (601-3)
Clone Line Table (603-3)
| C0 | S1 | S2 | C0 |
|---|---|---|---|
DBA Assignment per Snap_ID (604-3)
| SnapID | C0 | S1 | S2 |
|---|---|---|---|
| DBA | DBA2 | Not allocated | DBA1 |
Figure 6c

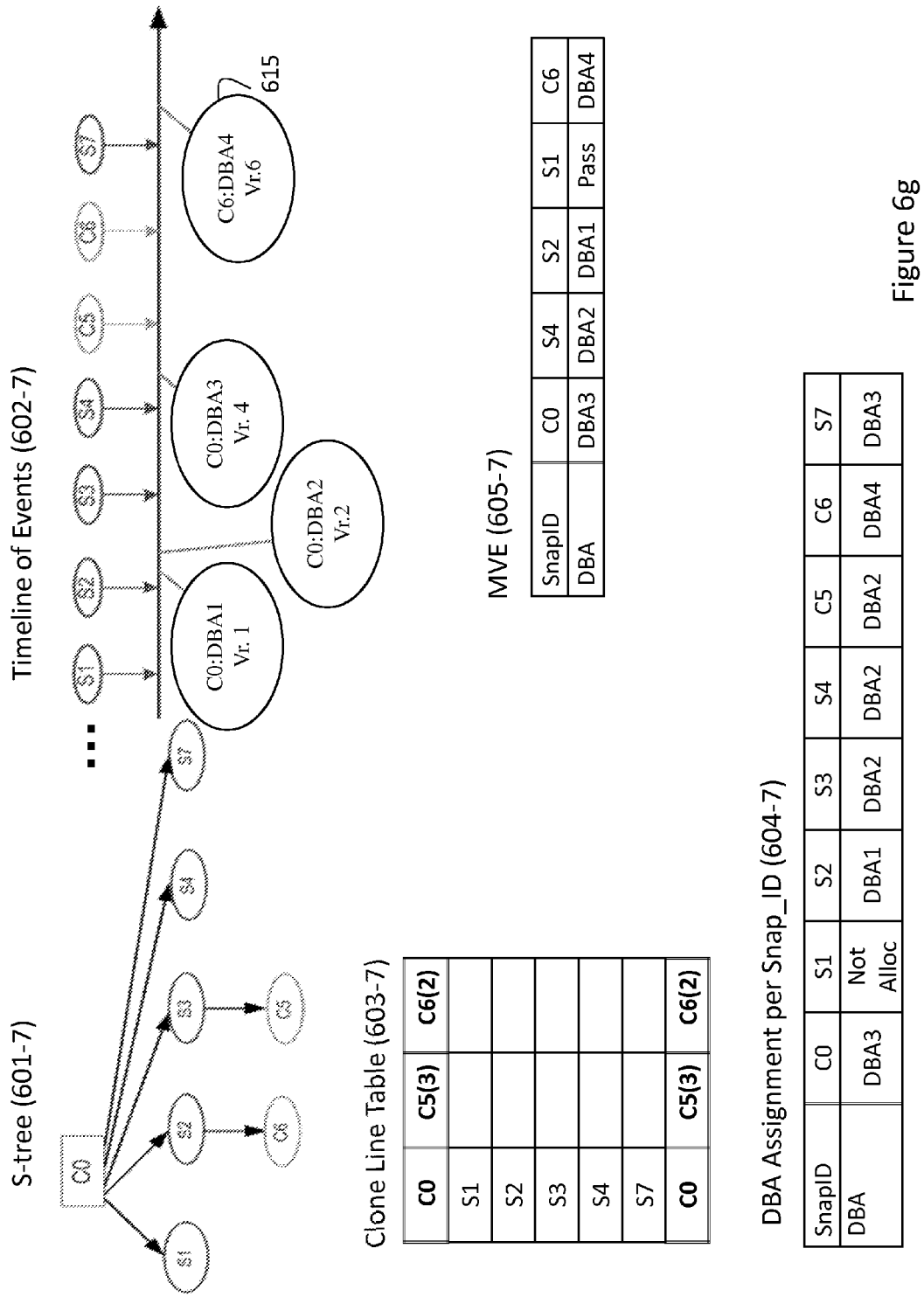

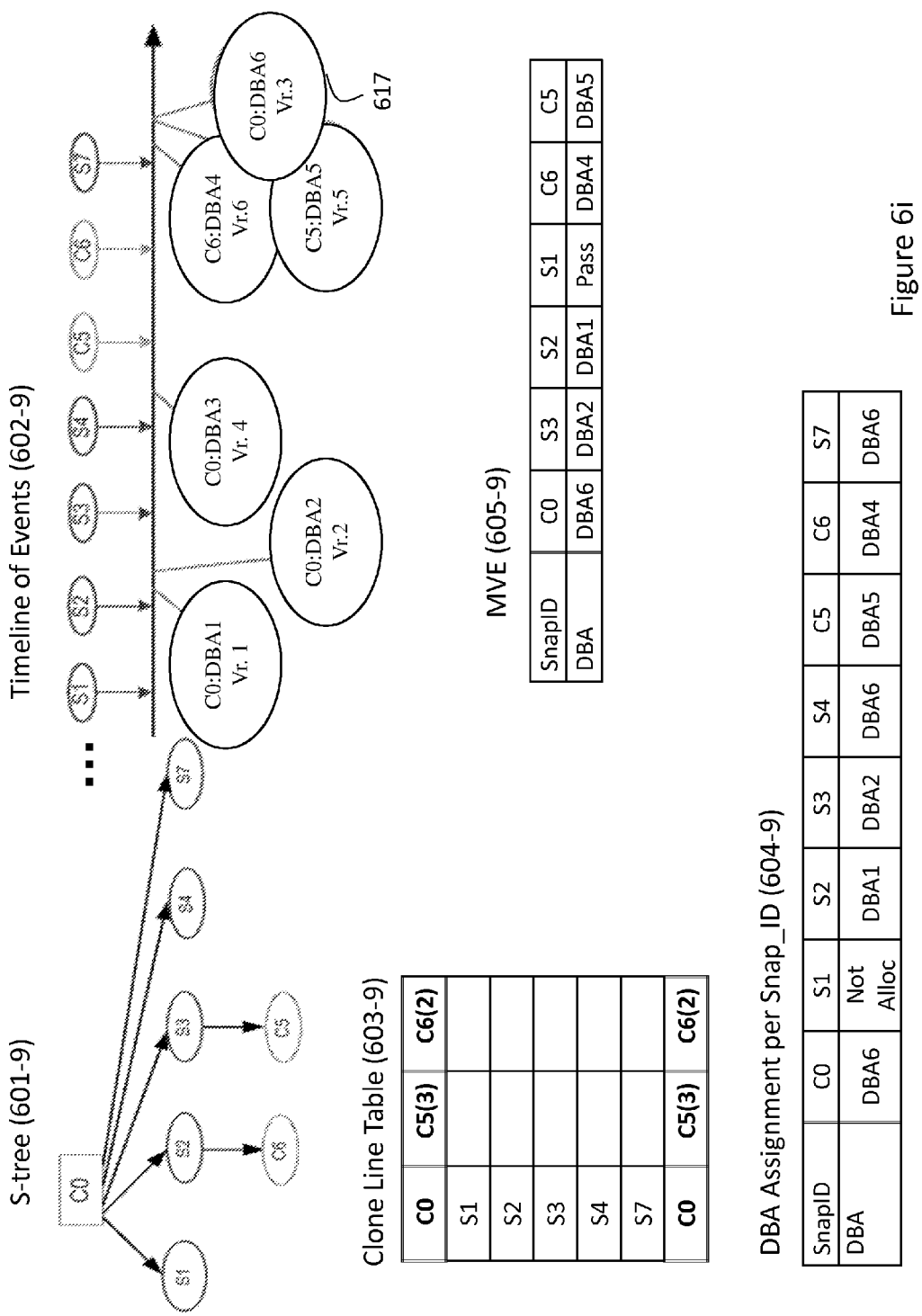

| C0 | C3(S2) | C6(S2) | C10(S9) | C11(S8) |
|----|--------|--------|---------|---------|
| S5 | S14    | S9     |         |         |
| S4 |        | S8     |         |         |
| S2 |        | S7     |         |         |
| S1 |        |        |         |         |
1300    FIG. 13
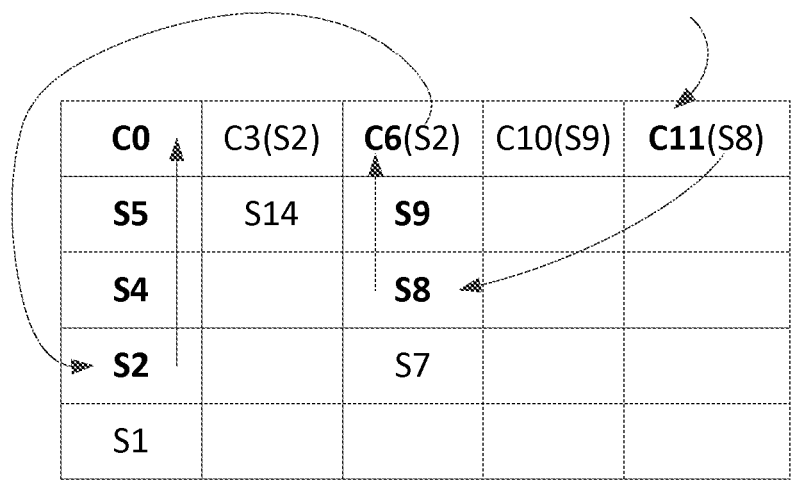
1400    FIG. 14

STORAGE SYSTEM CAPABLE OF MANAGING A PLURALITY OF SNAPSHOT FAMILIES AND METHOD OF SNAPSHOT FAMILY BASED READ

CROSS-REFERENCES TO RELATED APPLICATIONS

This application is a continuation in part (CIP) of U.S. patent application Ser. No. 14/092,169 filing date Nov. 27, 2013 which in turn claims priority from U.S. Provisional Patent Application No. 61/730,988 filed Nov. 29, 2012, all applications incorporated herein by reference in their entireties.

TECHNICAL FIELD

The presently disclosed subject matter relates generally to systems and methods of storing data and, particularly, to methods of operating storage systems in the presence of a plurality of snapshots, and systems thereof.

BACKGROUND OF THE INVENTION

Modern storage systems are configured to enable providing copies of existing data for purposes of backup, possible restore in case of future data corruption, testing, etc. The copies may be provided with the help of backup and/or snapshot techniques. The use of snapshot techniques greatly reduces the amount of storage space required for archiving large amounts of data.

Problems of operating storage systems in the presence of a plurality of snapshots have been recognized in the conventional art and various techniques have been developed to provide solutions. For example:

US Patent Application No. 2011/0119459 (Satoyama et al.) discloses a storage system including a storage device which configures an original volume for storing data which is read/written by a host, a copy volume for storing a copy of the original volume at a predetermined timing, and a snapshot volume for storing a snapshot data which is a snapshot of the original volume; and a controller which controls access from the host to the storage device. The controller copies data of the original volume to the copy volume at a predetermined timing; stores the snapshot data in the snapshot volume corresponding to a write request to the original volume without decreasing a performance of the original volume; manages a generation of the stored snapshot according to predetermined copy volume blocks and snapshot volume blocks, and manages a generation of the copy volume; and reads data from the snapshot volume and/or the copy volume when a read request to a volume of a generation different from that of the original volume is received from the host, without decreasing a performance of the original volume.

US Patent Application No. 2008/172542 (Kaushik) discloses a method, apparatus and system of a hierarchy of a structure of a volume. In one embodiment, a system includes a physical volume, a structure to provide a mapping to a location of a data segment of the physical volume that may include a table having a hierarchy, a logical volume management module to define a logical volume as an arrangement of the physical volume, a snapshot module that may automatically generate a point-in-time image of the logical volume, may prompt the logical volume management module to create and insert a first table and a second table into the hierarchy of the structure, the first table may provide a set of updates to the logical volume, the second table may provide a set of updates to the point-in-time image, and a data processing system to perform a write IO operation and a read IO operation.

US Patent Application 2008/301203 (Adkins et al.) discloses an embodiment where at least one snapshot thread manages a point in time snapshot of a file system stored within the space allocated to the file system. The snapshot thread tracks, for at least one block of the plurality of blocks of the file system, a separate entry in a snapshot map specifying if each at least one block is newly allocated following the creation of the point in time snapshot and specifying an addressed location of a snapshot copy of the at least one block, if copied. Separately, a file system handling thread tracks a mapping of an allocation state of each of said plurality of blocks of the file system. Responsive to detecting the file system triggered to write or delete a particular block from among the at least one block of the file system, the snapshot thread allows the file system to write to or delete the particular block without making a snapshot copy of the particular block if a particular entry for the particular block in the snapshot map specifies the particular block is newly allocated, wherein a block marked newly allocated was not in-use at the point in time of the file system snapshot.

U.S. Pat. No. 6,038,639 (O'Brien et al.) discloses a data file storage management system for snapshot copy operations which maintains a two level mapping table enabling the data files to be copied using the snapshot copy process and only having to update a single corresponding mapping table entry when the physical location of the data file is changed. The snapshot copy updates to the contents of the first level of the two level mapping table, which are stored on the backend data storage devices to provide a record of the snapshot copy operation which can be used to recover the correct contents of the mapping table. This record of the snapshot copy operations remains valid even though the physical location of a copied data file instance is subsequently changed. Furthermore, the physical storage space holding the updated portions of the first level of the two level mapping table can be managed using techniques like those used to manage the physical storage space holding data file instances. Mapping table updates resulting from the snapshot copy operation are delayed until all mapping table updates resulting from earlier data file write operations have been completed and any attempt to update the mapping table to reflect data written to the original data file or the copy data file that occurs after initiation of the copy must wait until the first set of mapping table pointers have been copied.

U.S. Pat. No. 7,165,156 (Cameron, et al.) discloses a chain of snapshots including read-write snapshots descending from a read only snapshot. The read only snapshots present a constant view of the data at the time the read only snapshot is created, and the read-write snapshot starts with the view but can be modified by the user without changing the view of its parent snapshot (e.g., the read only snapshot). The read-write snapshot can be written for various testing purposes while the read only snapshot remains undisturbed to preserve the original data.

SUMMARY

In accordance with certain aspects of the presently disclosed subject matter, there is provided a method of operating a storage system. The storage system comprises a control layer with a cache memory, the control layer is operable to manage a plurality of snapshot families, each family constituted by snapshot family (SF) members having hierarchical relations therebetween. The method comprises: upon receiving a read request specifying logical unit number (LUN) of an addressed logical volume and addressed logical block address (LBA) therein, the control layer identifying an addressed snapshot family and an addressed SF member therein corresponding to the addressed LUN. The control layer further searching the cache memory for an addressed data block corresponding to the addressed LBA and associated with the addressed snapshot family and the addressed SF member; in a case of missing the addressed data block in the cache memory, identifying in the cache memory all dirty data blocks corresponding to the addressed LBA and associated with the addressed snapshot family, thus giving rise to candidate data blocks; identifying for the addressed snapshot family an SF member representing, upon virtual destaging all candidate data blocks, the addressed LBA in a mapping data structure, thus giving rise to a destage owner, and in a case when the identified destage owner is associated with a candidate data block, reading from the cache memory such candidate data block. The mapping data structure is configured to provide mapping between a given LBA and one or more physical addresses corresponding to SF members such that a given physical address is represented by one and only one SF member among SF members sharing the given physical address.

In accordance with other aspects of the presently disclosed subject matter, there is provided a storage system comprising a control layer with a cache memory, the control layer configured to manage a plurality of snapshot families, each family constituted by snapshot family (SF) members having hierarchical relations therebetween. The control layer is further configured to identify, upon receiving a read request specifying logical unit number (LUN) of an addressed logical volume and addressed logical block address (LBA) therein, an addressed snapshot family and an addressed SF member therein corresponding to the addressed LUN; to search the cache memory for an addressed data block corresponding to the addressed LBA and associated with the addressed snapshot family and the addressed SF member; in a case of missing the addressed data block in the cache memory, to identify in the cache memory all dirty data blocks corresponding to the addressed LBA and associated with the addressed snapshot family, thus giving rise to candidate data blocks; to identify for the addressed snapshot family an SF member representing, upon virtual destaging all candidate data blocks, the addressed LBA in a mapping data structure, thus giving rise to a destage owner, and, in a case when the identified destage owner is associated with a candidate data block, to read from the cache memory such candidate data block. The mapping data structure is configured to provide mapping between a given LBA and one or more physical addresses corresponding to SF members such that a given physical address is represented by one and only one SF member among SF members sharing the given physical address.

The cache memory can be further modified to adopt the data block associated with the identified destage owner as the addressed data block.

In accordance with further aspects of the presently disclosed subject matter, the cache memory can comprise a cache directory comprising hash entries each associated with one or more chained headers, wherein all data blocks with the same LBA and associated with different SF members of a given snapshot family correspond to chained headers associated with a hash entry corresponding to the addressed snapshot family and the addressed LBA. Identifying the candidate data blocks can be provided by searching headers associated with respective hash entry corresponding to the addressed snapshot family and the addressed LBA.

In accordance with further aspects of the presently disclosed subject matter, the cache memory can further comprise a cache directory comprising, respectively associated with each given data block, data indicative of LBA corresponding to a given data block, SF member identifier indicative of SF member associated with a given data block, and Snap_version identifier indicative of the latest SF member existing at the time of writing a given data block to the cache memory. The virtual destaging can comprise: the control layer identifying for each of the candidate data blocks a pair constituted by SF member identifier and Snap_version identifier, thus giving rise to a "dirty set" comprising the pairs identified for all candidate data blocks; generating a copy of the mapping data structure; and modifying the generated copy of the mapping data structure by simulating, in consideration of respective Snap_versions, destage of the data blocks corresponding to the "dirty set", thereby identifying the destage owner. Selecting data blocks during the destage simulating can be provided in an arbitrary order.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 6a-6j illustrate non-limiting examples of evolution of an S-tree, a clone line table and of MVE data structure in correspondence with events related to the snapshot family illustrated in FIGS. 2-3;

FIG. 13 illustrates a clone line of a certain snapshot family according to an embodiment of the invention;

FIG. 14 illustrates a clone line of a certain snapshot family and an order of searching for a relevant data entity candidate according to an embodiment of the invention.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "calculating", "determining", "generating", "identifying", "searching" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, storage system and parts thereof (e.g. control layer and parts thereof) disclosed in the present application.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
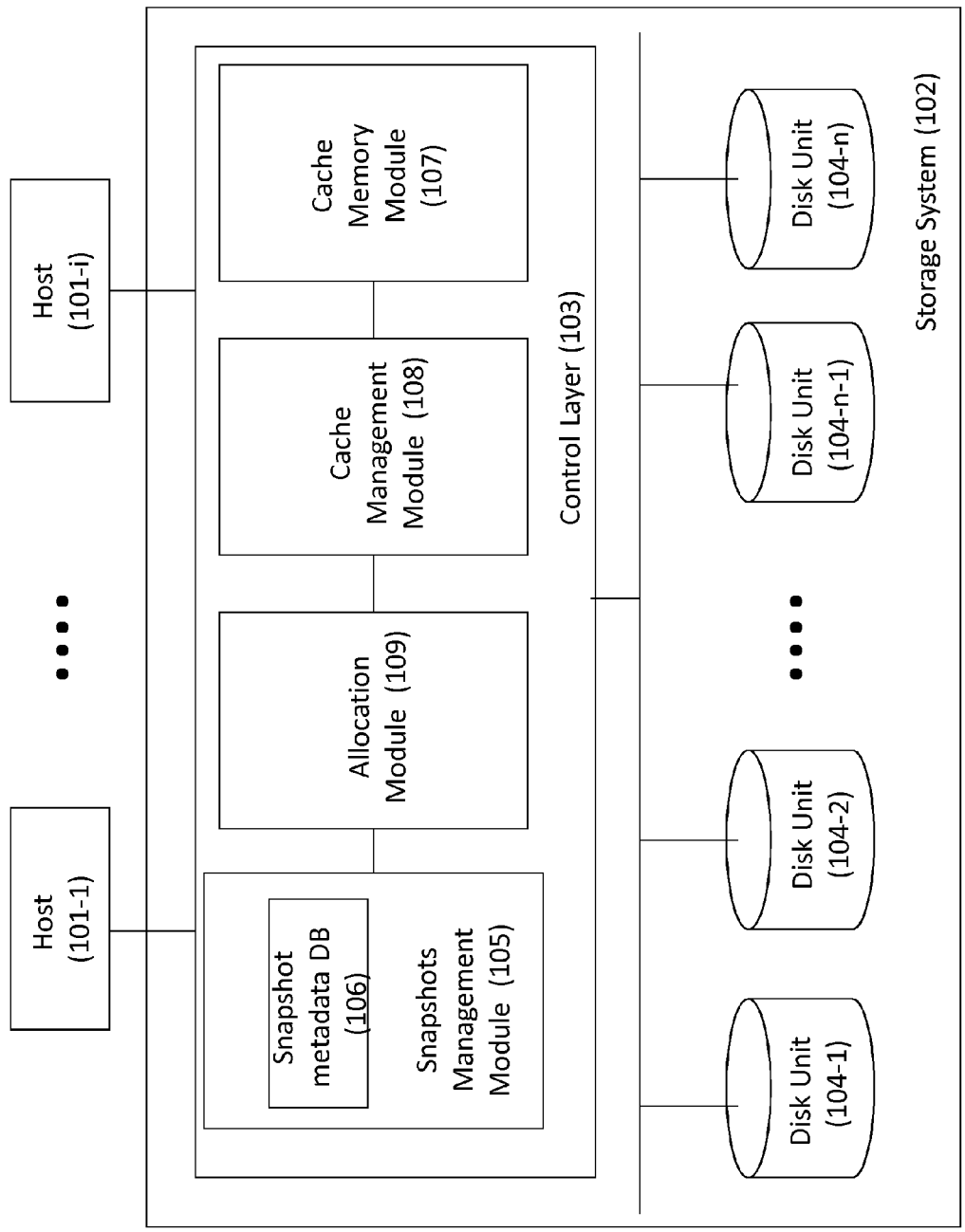
FIG. 1 illustrates a schematic functional diagram of a mass storage system in accordance with certain embodiments of the presently disclosed subject matter.

It is to be understood that the term "non-transitory" is used herein to exclude transitory, propagating signals, but to include, otherwise, any volatile or non-volatile computer memory technology suitable to the presently disclosed subject matter. Bearing this in mind, attention is drawn to FIG. 1 illustrating a non-limiting example of a schematic functional diagram of a mass storage system in accordance with certain embodiments of the presently disclosed subject matter. The mass storage system may store petabytes of data and even more.

The illustrated mass storage system 102 provides common storage means to be shared by a plurality of host computers (illustrated as 101-1-101-$n$). The storage system comprises a control layer 103 comprising one or more appropriate storage control devices operatively coupled to the plurality of host computers and operable to control access operations between the plurality of host computers and a plurality of data storage devices (e.g. a plurality of physical disk drives (PD) organized in one or more arrays illustrated as disk units 104-1-104-$n$). The storage devices constitute a physical storage space optionally distributed over one or more storage nodes, wherein the storage control layer is operable to control interface operations (including access operations) between the host computers and the storage physical space. The storage system is configured in a manner enabling direct or indirect servicing a request directed at any available address in the physical storage space.

The physical storage space can comprise any appropriate permanent storage medium and can include, by way of non-limiting example, a plurality of physical disk drives (PD) organized in one or more arrays (illustrated as disk units 104-1-104-$n$). The physical storage space comprises a plurality of data blocks, each data block being characterized by a pair ($DD_{id}$, DBA), and where $DD_{id}$ is a serial number associated with the physical disk drive accommodating the data block, and DBA is a logical block number within the respective disk. By way of non-limiting example, $DD_{id}$ may represent a serial number internally assigned to the physical disk drive by the system or, alternatively, a WWN or universal serial number assigned to the disk drive by a vendor.

Stored data can be logically represented to a client in terms of logical objects. Depending on storage protocol, the logical objects may be logical volumes, data files, multimedia files, snapshots and other copies, etc. For purpose of illustration only, the following description is provided with respect to logical objects represented by logical volumes.

A logical volume (LV) is a virtual entity logically representing a plurality of data blocks and acting as basic units for data handling and organization within the system. Logical volumes are characterized by successive Logical Block Addresses (LBA) ranging from 0 to a number K, wherein K is the number of data blocks comprised in the logical volume. Different LVs may comprise different numbers of data blocks, while the data blocks are typically of equal size (e.g. 512 bytes).

The same logical volume can be exposed to the outside world as one or more uniquely addressable logical units, each appearing as a single virtual storage device to hosts, file systems, databases, and other application programs. Each logical unit can be characterized by a logical unit identifier (e.g. a logical unit number, or LUN), used to identify the logical unit when addressed by the SCSI protocol or protocols which encapsulate SCSI, such as, for example, Fibre Channel or iSCSI. LUN numbers can be assigned to the logical units in accordance with an addressing scheme. By way of non-limiting example, in a multiple port storage array, a logical volume can be assigned a different LUN on each port through which the logical volume is accessed. Optionally, an external management server (not shown in FIG. 1) can keep a list of which LUNs each host and/or application is allowed to access.

When receiving a write request from a host, the storage control layer identifies a physical location(s) designated for writing the respective data. Similarly, when receiving a read request from the host, the storage control layer identifies the physical location(s) of the desired data portion(s) and further processes the request accordingly. The storage control layer further issues updates of a given data object to all storage nodes which physically store data related to the data object. The storage control layer is further operable to redirect, if required, the request/update to storage device(s) with appropriate storage location(s) irrespective of the specific storage control device receiving the access request.

The control layer further comprises a snapshot management module 105. The functions of the snapshot management module include managing the snapshots and groups thereof.

A snapshot logical volume (referred to hereinafter also as a "snapshot") is a logical entity representing a virtual copy of a source logical volume as it existed at the time of creating the snapshot. As will be further detailed with reference to FIGS. 2-3, a given snapshot (referred to hereinafter as a parent snapshot) can serve as a source volume for one or more further snapshots (referred to hereinafter as child snapshots). Each snapshot has one source logical volume (initial logical volume or a parent snapshot). A given logical volume at a starting point-in-time (referred to hereinafter as a master logical volume) and the snapshots corresponding thereto and created at different later points-in-time constitute a snapshot family associated with the given master logical volume. It is noted that starting point-in-time is configurable and any writable snapshot can be selected as a master volume of the snapshot family constituted by the master volume and its descendant snapshots. The master logical volume and the snapshots corresponding thereto are referred to hereinafter as snapshot family members. Some of the snapshots in the snapshot family can be writable, while other snapshots can be configured as read-only snapshots. The hierarchical relationship (e.g. siblings, parents, grandparents, siblings of a parent, descendants (children), etc.) between the members of the snapshot family can be represented as a tree with one or more branches.

For purpose of illustration only, in the following description a snapshot family corresponds to a given logical volume. Those skilled in the art will readily appreciate that the teachings of the present disclosure are applicable in a similar manner to a snapshot family corresponding to other appropriate logical groups (e.g. snapshots created at different point in time for a consistency group of logical volumes, for one or more virtual partitions, or for other logical objects).

A snapshot is usually implemented by using pointers. Any newly created snapshot shares data with the source logical volume with the help of pointers constituting a part of the system metadata. Hence, at the time of creation, the new snapshot consumes physical resources merely for storing related metadata, and no additional physical resources are required for storing data associated with the snapshot logical volume. Only when a portion of either the source or its respective snapshot is modified, new data is created and, accordingly, new physical resources are allocated to this data in the disks.

Each of the snapshot family's members comprises the same number of logical blocks. In order for either the source volume or the snapshot to be addressable from an external host via a SCSI command, a LUN has to be defined, thus enabling connection between a port in the host and the volume or snapshot via a respective port in the storage system. The information about the defined LUNs is stored as a part of the system metadata. Access requests (e.g. write requests, read requests, etc. are addressed to the LUN with specified ranges of LBAs. The storage system can interpret the request so that it will be addressed to the intended source volume or snapshot.

Metadata related to snapshot management can be managed by the snapshot management module 105 and accommodated at a dedicated location(s) in the storage devices and/or in a non-volatile memory comprised in the control layer (e.g. implemented as snapshot metadata database 106 of the snapshot management module). A copy of the snapshot metadata can further reside in the volatile memory. By way of non-limiting example, the metadata accommodated in connection with snapshots management can include the snapshot volume identifiers (e.g. Snap_ID, Snap_LUN, etc.), flags indicating various states related to the snapshot (e.g., in use, delete in progress, marked for deletion, delete complete, etc.), size of snapshot volumes, and other snapshot related metadata.

The storage control layer 103 further comprises a volatile cache memory 107 for temporarily storing the data to be written to the storage devices in response to a write request and/or for temporarily storing the data to be read from the storage devices in response to a read request. In accordance with certain embodiments of the presently disclosed subject matter, the control layer further comprises a cache management module 108 operatively connected to the cache memory and to the snapshot management module 105.

Upon receiving by the control layer a read request specifying LBA to be read, the cache management module determines whether the respective data is presently contained within the cache. If the determination indicates that the addressed block is presently within the cache, then a cache hit occurs and the data can be transferred from the cache to the host. On the other hand, if the check indicates that the requested data is not within the cache, then a cache miss occurs, and the respective data is read from a storage device. Managing cache "hit" or "miss" determination in accordance with certain embodiments of the currently disclosed subject matter is further detailed with reference to FIGS. 7-10.

During the write operation the data is temporarily retained in cache memory 107 until subsequently written to one or more data storage devices. Such temporarily retained data, modified in cache and not modified in the storage devices, is referred to hereinafter as "dirty data". Once the dirty data is sent to the respective nonvolatile storage medium, its status is changed to "non-write-pending", and the storage system relates to this data as stored at the nonvolatile storage medium and allowed to be erased from the cache memory. Such data is referred to hereinafter as "clean data".

Optionally, the control layer can further comprise (not shown) a first virtual layer operable to represent the logical address space, the first virtual layer characterized by a plurality of virtual unit addresses (VUA). Alternatively or additionally, the control layer can further comprise a second virtual layer operable to represent the physical storage space, the second virtual layer characterized by a plurality of virtual disk addresses (VDA). By way of non-limiting example, respective architecture and operation of the control layer is detailed in International Patent Application No. WO 2010/092576 assigned to the Assignee of the present application and incorporated thereto by reference in its entirety.

Mapping between logical addresses (LBA addresses, VUA addresses) and physical addresses (VDA addresses, DBA addresses) can comprise at least one of the mapping options:
  a) mapping between LBA addresses and DBA addresses;
  b) mapping between VUA addresses and VDA addresses;
  c) mapping between LBA addresses and VDA addresses; and
  d) mapping between VUA addresses and DBA addresses.

For purpose of illustration only, in the following description the mapping is presented between LBA addresses and DBA addresses. Those skilled in the art will readily appreciate that the teachings of the present disclosure are applicable in a similar manner to other mapping options between logical addresses and physical addresses.

The control layer further comprises an allocation module 109 operatively coupled to the snapshot management module 105 and the cache management module 108. The allocation module 109 can be configured to handle one or more mapping data structures, each assigned to a respective given snapshot family and operable to provide mapping between one or more contiguous ranges of logical addresses within logical address space of the given snapshot family and physical addresses corresponding to a snapshot family member specified in an access request. Such data structure is referred to hereinafter as a snapshot family mapping data structure and is further detailed with reference to FIGS. 4-10.

The snapshot management module, the cache memory, the cache management module and the allocation module are operatively connected, configured to facilitate operations in accordance with the presently disclosed subject matter as further detailed with reference to FIGS. 2-10 and each can be implemented in any appropriate combination of software, firmware and hardware. The snapshot management module, the allocation module, the cache memory and/or the cache management module can be implemented as centralized modules operatively connected to the plurality of storage control devices or can be, at least partly, distributed over some or all storage control devices.

Those versed in the art will readily appreciate that the teachings of the presently disclosed subject matter are not bound by the system illustrated in FIG. 1, equivalent and/or modified functionality can be consolidated or divided in another manner and can be implemented in any appropriate combination of software, firmware and hardware.

Figure 2:
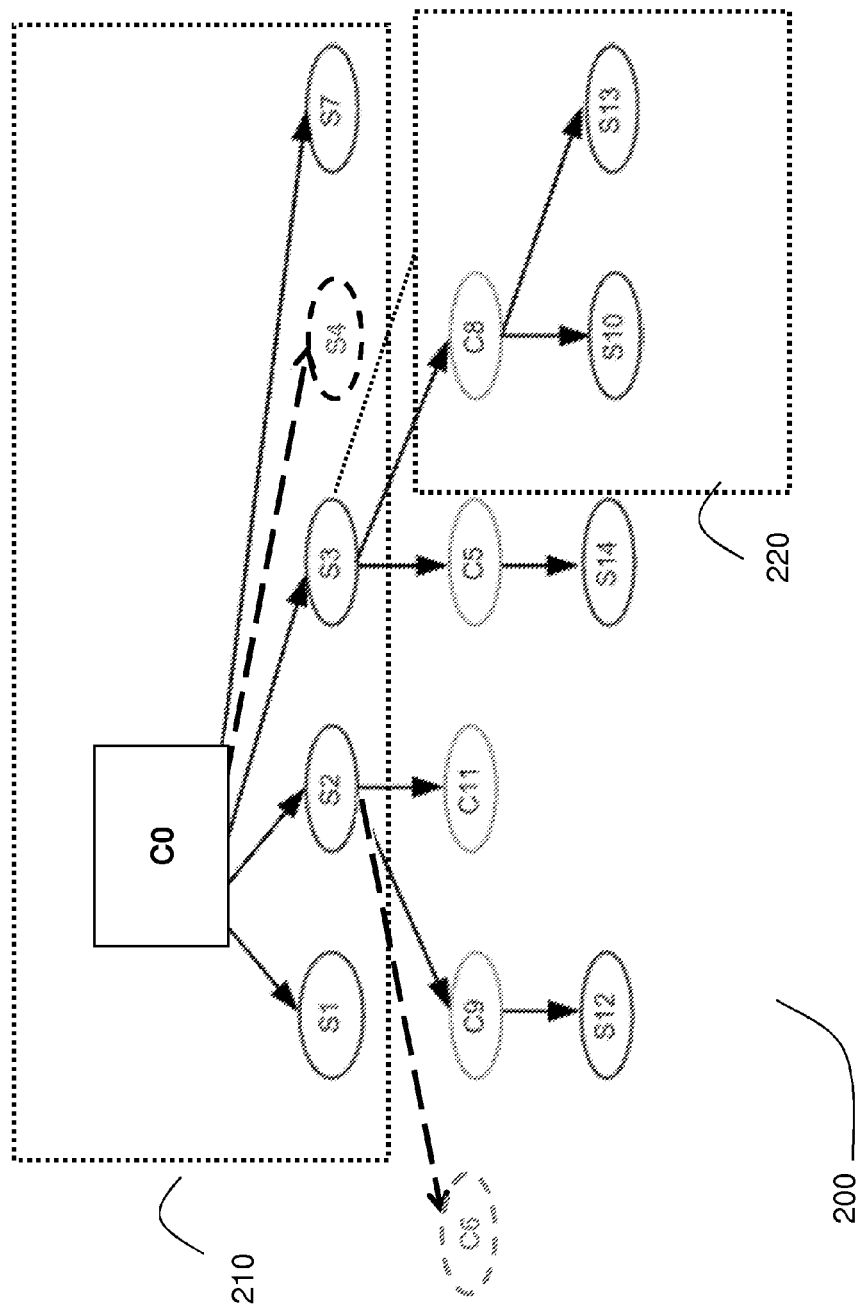
FIG. 2 illustrates an exemplary snapshot family represented by a snapshot tree.

FIG. 2 illustrates an exemplarily snapshot family represented by a snapshot tree (referred to hereinafter also as S-tree). The illustrated S-tree 200 represents the relationship between a master logical volume C0 and its snapshots. Unless specifically stated otherwise, it is appreciated that throughout the specification the following terms should be construed as following:

Family_ID denotes an identifier associated with the entire snapshot family including a master volume constituting a root of a respective snapshot family and its descendant snapshots.

Members of the snapshot family are denoted by letter S indicative of read-only snapshots or by letter C indicative of the master volume or writable snapshots (also referred to hereinafter as clones). The members of the snapshot family are further denoted by a snapshot identifier, Snap_ID, which uniquely identifies a specific snapshot member within the snapshot family and is further indicative of the order of creation of the member. The snapshot identifier may be, for example, a running index associated with the respective members according to their order of creation, etc. A snapshot identifier of an earlier created member is smaller than a snapshot identifier of a later created snapshot. Referring to S-Tree 200, snapshot S10, for example, was created before S12, S13, S14 and C11 (even though the latter resides in a higher hierarchy level in the tree than the hierarchy level of S10). The master volume is denoted as C0.

It is noted that if writable snapshots are not supported, the S-tree only includes C0 as the root with all the snapshots residing at the same level next to C0.

By way of non-limiting example, the illustrated snapshot family is generated in a manner that read-only snapshots are generated as children of writeable snapshots (clones), and the clones are generated as children of read-only snapshots, i.e. a parent of a read-only member is always a writable member of the snapshot family.

In the illustrated S-tree, the writable master volume C0 has direct read-only children S1, S2, S3, S4 and S7. Snapshots C5, C8, S14, S10 and S13 are descendants of S3 while S10 and S13 are children of C8; C6, C9, C11 and S12 are descendants of S2 while S12 is a child of C9. Dashed lines for S4 and C6 denote that these snapshots have been deleted.

S-tree 200 is updated (e.g. by the snapshot management module) each time a snapshot in the family is created, removed or restored.

In accordance with certain embodiments of the presently disclosed subject matter, each node of the S-Tree can be associated with information relating to a respective member of the snapshot family: e.g. references to an older sibling in the S-tree, references to a younger sibling, parent, descendants, read-only flag, etc. Fast access to the nodes in the S-Tree can be enabled by maintaining a Snapshot Lookup Table. Optionally, a separate look-up table can be assigned to each snapshot family. The Snapshot Lookup Table is characterized by Snap_ID as a key, and a pointer to the location of the respective node in memory as the lookup value.

A group of snapshots, constituted by a writable member and one or more generations of read-only children with no writable member between the generations, is referred to hereinafter as an inheritance cluster. For example, in the illustrated S-tree 200, an inheritance cluster 210 includes the master volume C0 and read-only snapshots S1, S2, S3, S4 and S7. An inheritance cluster can be further associated with a direct parent of its writable member, this direct parent can serve as a link to an upper level inheritance cluster. For example, an inheritance cluster 220 includes the writable member C8, its read-only descendants S10 and S13. The inheritance cluster 220 is further associated with S3, the read-only parent of the writable member C8, which links between cluster 220 and the upper inheritance cluster 210.

Each writable member of the snapshot family can be associated with a corresponding inheritance cluster. A sequential relationship between the members of a given inheritance cluster can be represented by a column in a clone line table, such a column being referred to hereinafter as a clone line. The clone line table comprises one or more clone lines, one clone line for each writeable family member. A clone line of a given writable family member (such member being referred to hereinafter also as a parent clone) comprises a sequence of the parent clone and read-only members of a respective inheritance cluster, the sequence order being in accordance with respective creation time. The clone line further comprises a value indicative of the direct parent of the parent clone, this direct parent associated with the respective inheritance cluster and linking the cluster to the upper levels in the S-tree.

Figure 3:
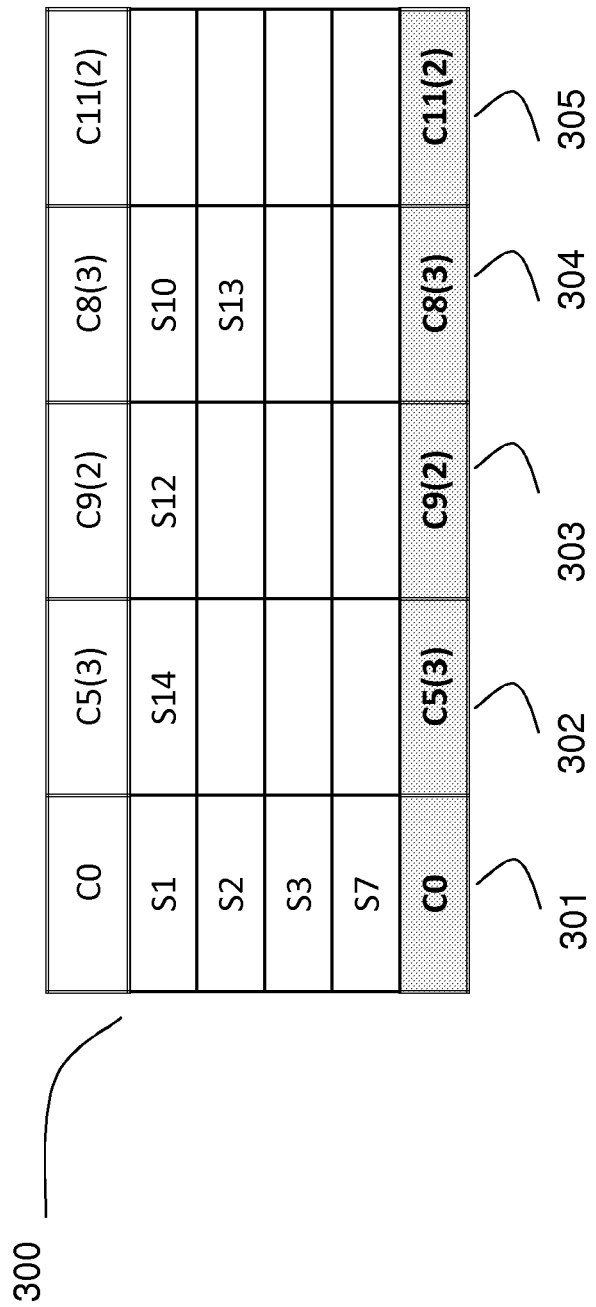
FIG. 3 illustrates an exemplarily clone line table corresponding to the exemplary S-tree illustrated in FIG. 2.
Figure 4:
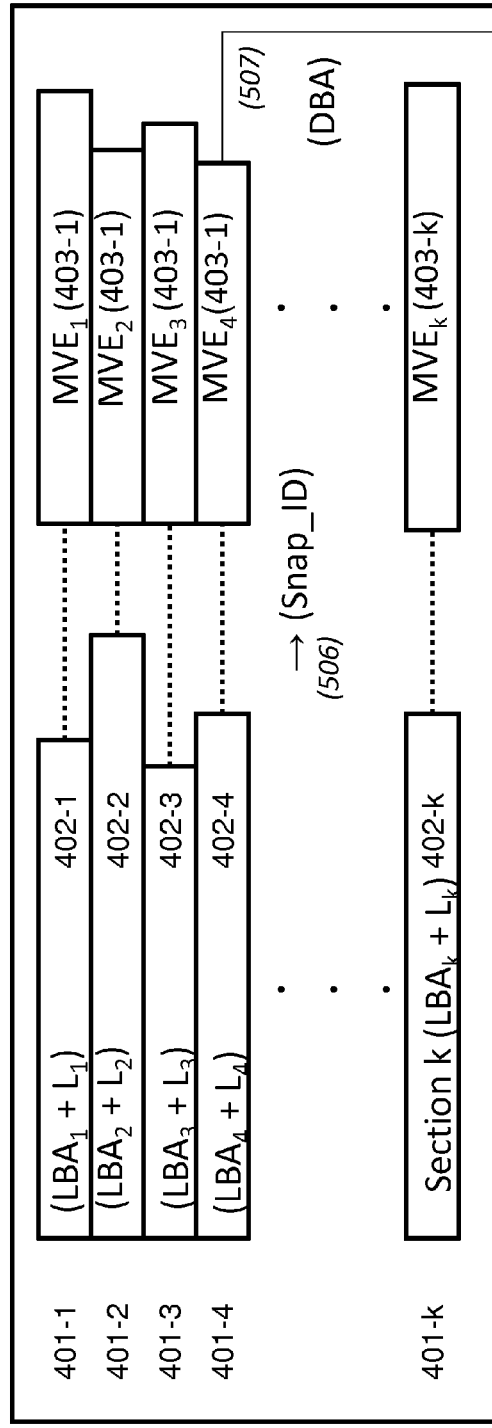
FIG. 4a illustrates a snapshot family mapping data structure configured in accordance with certain embodiments of the presently disclosed subject matter.
FIG. 4b illustrates an exemplary MVE data structure corresponding to a given LBA range in the snapshot family illustrated in FIGS. 2 and 3.

An exemplary clone line table 300 corresponding to the S-tree 200 is illustrated in FIG. 3. The numbers in brackets in the first elements of the clone lines are indicative of direct parents of respective parent clones.

For example, the clone line 301 corresponds to the inheritance cluster 210. The clone line comprises the master volume C0 as a parent clone and the read-only snapshots S1, S2, S3 and S7 being the direct children of the master volume. The snapshot S1 has been created before the snapshot S2; the snapshot S3 has been created after the snapshot S2 but before the snapshot S7. The clone line 302 with the parent clone C5 further comprises the read-only snapshot S14. The value in brackets indicates that the clone C5 is the direct child of S3. The clone line 303 with the parent clone C9 comprises the read-only snapshot S12. The value in brackets indicates that the clone C9 is the direct child of S2. The clone line 304 with the parent clone C8 corresponds to the inheritance cluster 220 and further comprises the read-only snapshots S10 and S13 being the direct children of the clone C8. The value in brackets indicates that the clone C8 is the direct child of S3. The clone line 305 with the parent clone C11 does not comprise any direct child. The value in brackets indicates that the clone C11 is the direct child of S2.

Optionally, in addition to the sequence of a parent clone and its read-only children, a clone line can be configured to comprise the parent clone also as a last element, thereby enabling traversing the table in a hierarchical manner. It is appreciated that throughout the following specification a parent clone is considered as a first and a last element in a respective clone line.

Likewise the S-tree, the clone-line table is updated (e.g. by the snapshot management module) each time a snapshot in the family is created, removed or restored.

FIG. 4a illustrates a snapshot family mapping data structure (referred to hereinafter also as SFM data structure or SFM) configured in accordance with certain embodiments of the presently disclosed subject matter.

Each snapshot family is provided (e.g. by the allocation module 109 in cooperation with the snapshot management module 105) with a snapshot family mapping data structure assigned thereto. Family_ID of a snapshot family is also indicative of the assigned SFM data structure.

For each access request addressed to a member of given snapshot family, the SFM data structure is operable to provide mapping between the request (LUN, LBAx, length) specifying an addressed LUN, an offset $LBA_x$ and a length of the required LBA range and physical addresses corresponding to the request. Thus, the entire snapshot family is mapped to physical addresses corresponding to different family members with the help of the SFM data structure associated with that family.

In accordance with certain embodiments of the presently disclosed subject matter, each family is characterized by a snapshot family logical address space (also referred to hereinafter as SF logical address space). The size of SF logical address space is equal to the size of any of the family members' logical volumes, while a given offset in the SF logical address space corresponds to the same offset in any one of the family member volumes. By way of non-limiting example, an offset LBAx in the SF logical address space corresponds to offset LBAx in an access request (LUN1, LBAx, length1) addressed to a snapshot family member and to LBAx in an access request (LUN2, LBAx, length2) addressed to another member of the same snapshot family.

The SFM data structure 400 includes one or more entries (illustrated as 401-1-401-k), each entry corresponding to a certain variable-length range of contiguous logical addresses within the SF logical address space. A range of logical addresses is contiguous in a SF logical address space, if this range is contiguous in any one of the members of respective snapshot family. Each mapping entry maps a different range of logical addresses and different entries may map a different size of range.

Each entry is characterized by a value indicative of offset in SF logical address space and length of a contiguous LBA range corresponding to the entry (illustrated, respectively, as 402-1-402-k) within the snapshot family logical address space. For example, a certain entry can correspond to logical address range 0-64 Kbyte (i.e. address range of 64K length with zero offset in the SF logical address space), while the next entry can correspond to the logical address range 64 Kbyte-1024 Kbyte (i.e. address range of 960K length with offset=64K in the SF logical address space). It is noted that lengths of contiguous LBA ranges corresponding to the entries are defined in multiples of fixed-length (e.g. 64 Kb) LBA data range. For purpose of illustration only, the access operations are further described herein in terms of entire data portions being multiples of the data blocks corresponding to this fixed-length LBA data range. Those skilled in the art will readily appreciate that the teachings of the presently disclosed subject matter are applicable in a similar manner to partial data portions.

Each entry is further configured to comprise one or more mappings for mapping an LBA range associated with the mapping entry into one or more physical address ranges respectively correlated to one or more members of the snapshot family. Each of the mappings correlates a physical address range to a member of the family, for example, by including in the mapping entry a tuple of physical address range and the correlated member. Other correlation techniques may be used, for example: the mapping entry can include a list of physical address ranges and a bitmap that indicates which family member has a corresponding physical address range, for example, a set bit indicates that the corresponding member is correlated with a physical address range that is included in the entry, wherein the first set bit correlates the corresponding member to the first physical address range in the list of physical address ranges.

By way of non-limiting example, the mappings for a given entry can be provided by a data structure (illustrated, respectively, as 403-1-403-k) associated with the entry and configured to provide mapping between LBA range corresponding to the entry and range of physical addresses assigned to different members of the snapshot family. Such data structure is referred to hereinafter as a multiple value entry (MVE) data structure or MVE.

As will be detailed further with reference to FIGS. 4b, a given MVE data structure 403-k provides, for contiguous LBA range 402-k in a SF logical address space, association between members in the snapshot family and values indicative of DBA ranges assigned to these members.

The length of the contiguous LBA range can vary from entry to entry in the SFM data structure. The length of contiguous LBA range in a given entry and/or its offset in SF logical address space can also vary depending on different (e.g. write, delete, etc.) operations provided with regard to the logical address space of the snapshot family. Responsive to transferring a certain LBA range from one SFM entry to another, respective Snap_ID→DBA mapping data can be transferred to MVE data structure associated with another SFM entry.

Figure 5:
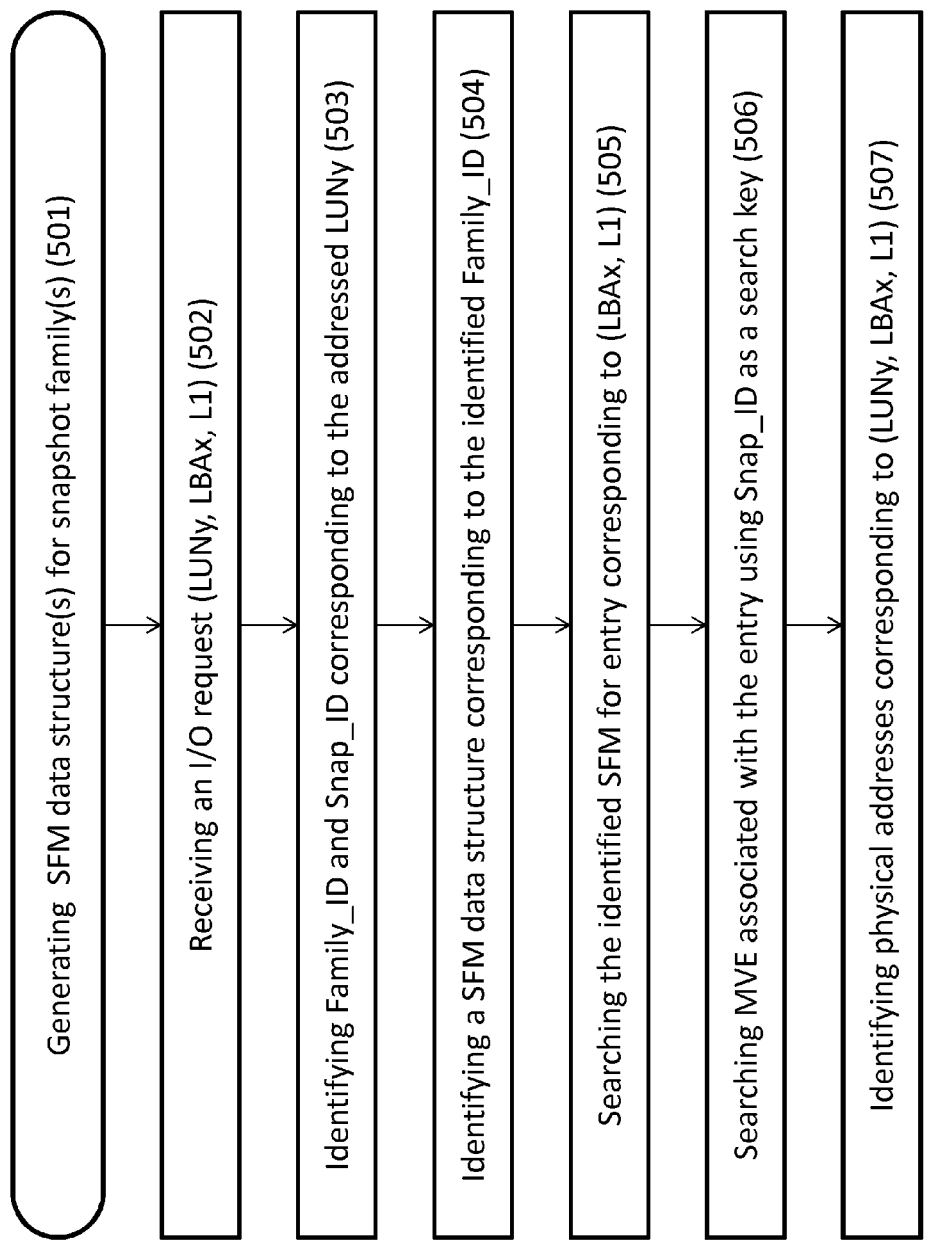
FIG. 5 illustrates a generalized flow chart of identifying physical addresses of data specified in an I/O request addressed to a given LUN in accordance with certain embodiments of the presently disclosed subject matter.

Referring to FIG. 5, there is illustrated a generalized flow chart of identifying physical addresses of data specified in an access request addressed to a given LUN in accordance with certain embodiments of the presently disclosed subject matter.

Each snapshot family is provided (e.g. by the allocation module 109 in cooperation with the snapshot management module 105) with a corresponding SFM data structure. Upon receiving an access request (LUNy, LBAx, L1) (502) addressed to a snapshot family member corresponding to LUNy, the control layer (e.g. using the snapshot management module 105) identifies (503) Family_ID and Snap_ID corresponding to the addressed LUNy. It is noted, that access request can be addressed only to snapshots with assigned LUNs.

The control layer further identifies (e.g. using the allocation module 109) a snapshot family mapping data structure corresponding to the identified Family_ID (504) and uses the LBA range specified in the request for searching (505) the identified SFM for entry corresponding to this LBA range (i.e. entry corresponding to the range LBAx, L1 within the SF logical address space).

For purpose of illustration only, in the following description access requests are addressed to LBA ranges corresponding to a single SFM entry. Those skilled in the art will readily appreciate that the teachings of the present disclosure are applicable in a similar manner to any addressed LBA range (e.g. an access request addressing LBA ranges in several SFM entries can be handled as several access requests, each addressing LBA range in a single entry).

The control layer further uses Snap_ID as a key for searching (506) MVE associated with the found entry for identifying (507) the physical addresses corresponding in the addressed member of the snapshot family to the requested LBA range. By way of non-limiting example, searches 505, 506 and 507 can be provided by the allocation module 109.

Referring back to FIG. 4a, by way of non-limiting example, a snapshot family mapping data structure can be configured as a mapping tree. The mapping tree can be configured as an ordered tree data structure comprising one or more leaves. For example, the tree can be configured in a manner detailed in US Patent Application No. 2011/0082997 assigned to the Assignee of the present application and incorporated herewith by reference in its entirety. A depth of a leaf in the tree can represent a length of contiguous range of logical addresses represented by the leaf, a path followed from a tree root to the leaf can indicate an offset of the range of addresses within the snapshot family logical address space; and MVE associated with the leaf can indicate corresponding DBA ranges assigned to different members of the snapshot family. Accordingly, the control layer can traverse the tree in order to find a leaf corresponding to the requested LBA range and further use MVE associated with the leaf for identifying DBA range corresponding to the addressed Snap_ID.

Referring to FIG. 4b, there is illustrated an exemplary MVE corresponding to a given LBA range in the snapshot family illustrated with reference to FIGS. 2 and 3.

The illustrated MVE data structure 404 provides, for a given LBA range, association between two multi-value entries: snapshots entry 405 comprising values (e.g. respective Snap_ID) indicative of members in the snapshot family and physical storage entry 406 comprising values indicative of DBA ranges corresponding to the values in the snapshots entry 405.

A given physical address range can be shared by more than one family member. Each value in the physical storage entry 406 corresponds to a physical address range assigned to one or more snapshot family members sharing the same physical addresses corresponding to the given LBA range.

The MVE data structure can be configured to present a given DBA range by one or more family members (referred to hereinafter as representative members) sharing the given DBA range, whilst to omit from the snapshot entry at least one family member (referred to hereinafter as an omitted member) sharing the given DBA range and different from any of the representative members.

In accordance with certain embodiments of the presently disclosed subject matter, the MVE data structure can be configured to provide uniqueness of presenting a given DBA range, i.e. the given DBA range shared by several family members is presented in the MVE data structure only once in association with one and only one family member among the family members sharing the respective DBA range. The rest of the family members sharing the same DBA range can be identified in accordance with pre-defined rules by using the MVE and data informative of the hierarchical and sequential relationship of the members in the snapshot family (e.g. S-tree and/or clone lines data structures).

For example, if all members sharing the same range of physical addresses are members of the same inheritance cluster (e.g. comprised in the same clone line), the snapshot entry of MVE data structure can include only the earliest created among them. If the members sharing the same range of physical addresses belong to a different inheritance cluster (e.g. comprises different clone lines), the snapshot entry of MVE data structure includes only the latest created member in the earliest created (i.e. upper layer) inheritance cluster.

In the illustrated non-limiting example, the master volume C0 has been modified after creation of the snapshots S1, S2 and S3 in the clone line 301, while there was no further modification of the master volume upon creating the snapshot S7. Accordingly, the snapshot S7 shares the range of physical addresses with the master volume C0, and snapshot entry 405 of the illustrated MVE data structure 404 does not comprise value indicative of S7, and a request addressed S7 or C0 will be mapped to the same DBA6 range.

In the illustrated non-limiting example, the parent clone C8 has been modified after the snapshot S13 has been created. The value in the physical storage entry corresponding to S13 (specified as "pass") is indicative that the respective snapshot does not share data with the modified parent and DBA range corresponding to the snapshot is presented by a snapshot from an upper level inheritance cluster.

In the illustrated example the physical address range corresponding to snapshot S1 has been unmapped (or, optionally, has been never written or allocated). The corresponding value in the physical storage entry is specified as "free".

Those versed in the art will readily appreciate that uniqueness of presenting a shared DBA range in MVE by one and only one family member among the family members sharing the same DBA range can be implemented in a manner other than illustrated with reference to FIG. 4b.

FIGS. 6a-6j illustrate non-limiting examples of evolution of an S-tree (from 601-1 to 601-10), a clone line table (from 603-1 to 603-10), a mapping table (from 604-1 to 604-10) indicative of DBA assignments for family members and of MVE data structure (from 605-1 to 605-10) in correspondence with events related to the snapshot family and illustrated in a timeline of events (from 602-1 to 602-10). It is noted that mapping table 604 represents all family members corresponding to specified DBA range and is used for illustration only, while the MVE data structure 605 enables uniqueness of presenting a given shared DBA range by one and only one family member and is a part of SFM data structure stored and maintained in the storage system. In a mass-storage system a snapshot family can comprise thousands, or even several thousands of snapshots. Using the MVE data structure (preferably MVE data structure with uniqueness of presenting a given shared DBA range) instead of a mapping table representing all family members allows increasing effectiveness of snapshot management.

The illustrated events include creating of new snapshots and operations related to writing to the cache memory and to the physical address space (destaging).

Figure 6A:
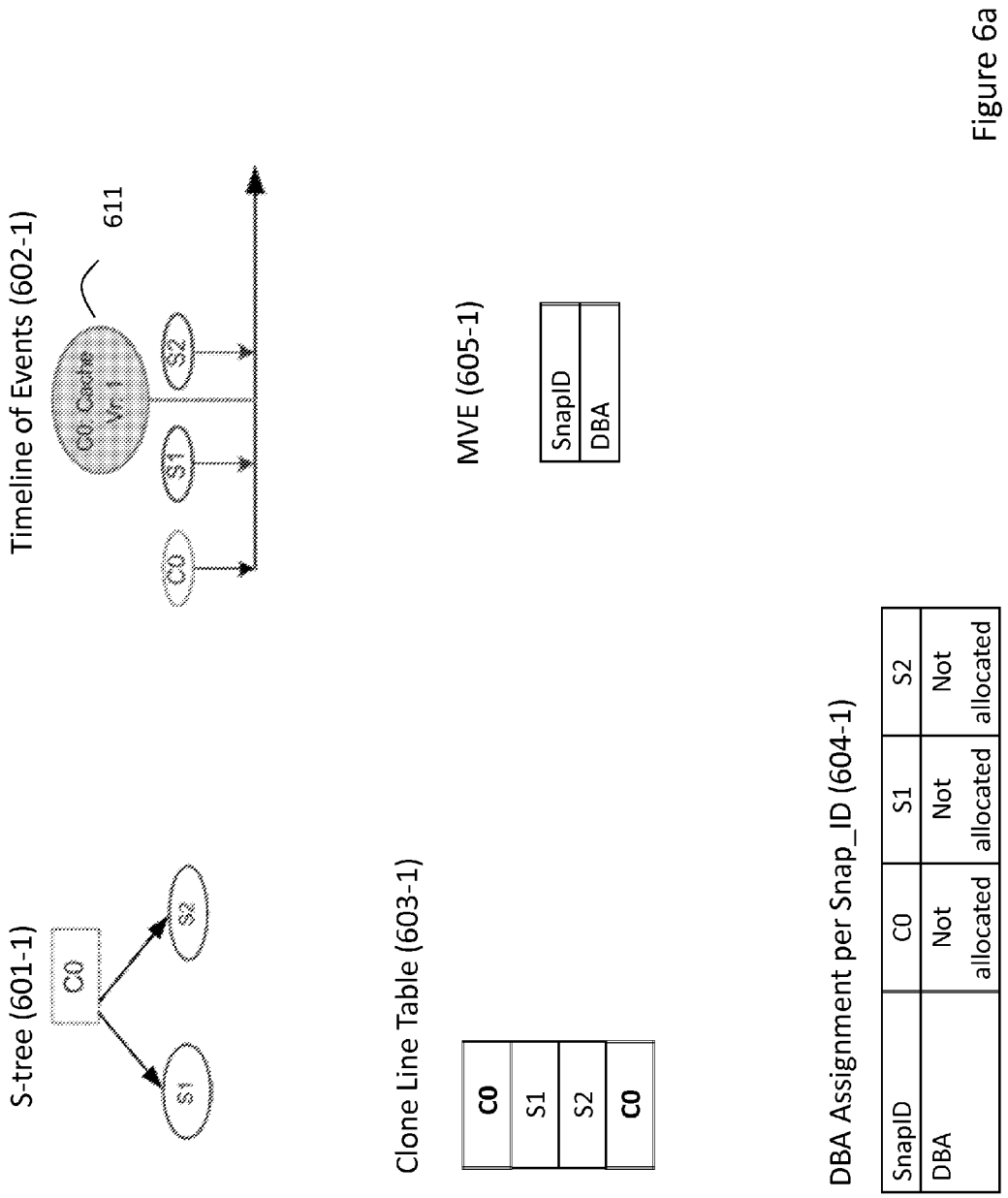

In accordance the timeline 602-1 illustrated in FIG. 6a, after creating the read-only snapshot S1 of the master volume C0, the control layer receives a write request addressed to the master volume. The write request specifies the addressed family member (C0 in the illustrated example). The control layer enables writing data (event 611) to the cache memory.

In accordance with certain embodiments of the presently disclosed subject matter, the control layer is configured (e.g. with the help of the snapshot management module) to recognize a current snapshot identifier indicative of the most recent snapshot and to associate data to be cached with the latest snapshot identifier existing at the time of writing a given data portion to a cache memory. Such snapshot identifier associated with the cached data is referred to hereinafter as Snap_version of the cached data. Thus, data cached in the cache memory is associated with an indication of the addressed snapshot family, snapshot family member and with Snap_version value indicative of the latest snapshot existing at the time of writing a given data portion to a cache memory.

In the non-limiting example illustrated in FIG. 6a, the data written to the cache memory is associated with the indication of Snap_version=1 (denoted as Vr.=1) as, at the moment of writing, the latest created snapshot (i.e. snapshot S1) had Snap_ID=1. Snapshot S2 is created after writing the data 611 to the cache memory. The illustrated in FIG. 6a stage does not comprise destaging data from the cache memory to the physical storage space. Accordingly, no DBA allocation has been provided, and the mapping table 604-1 and MVE data structure 605-1 are empty. The S-tree 601-1 and the clone line table 603-1 represent the snapshot family at the end of the illustrated stage.

Figure 6B:
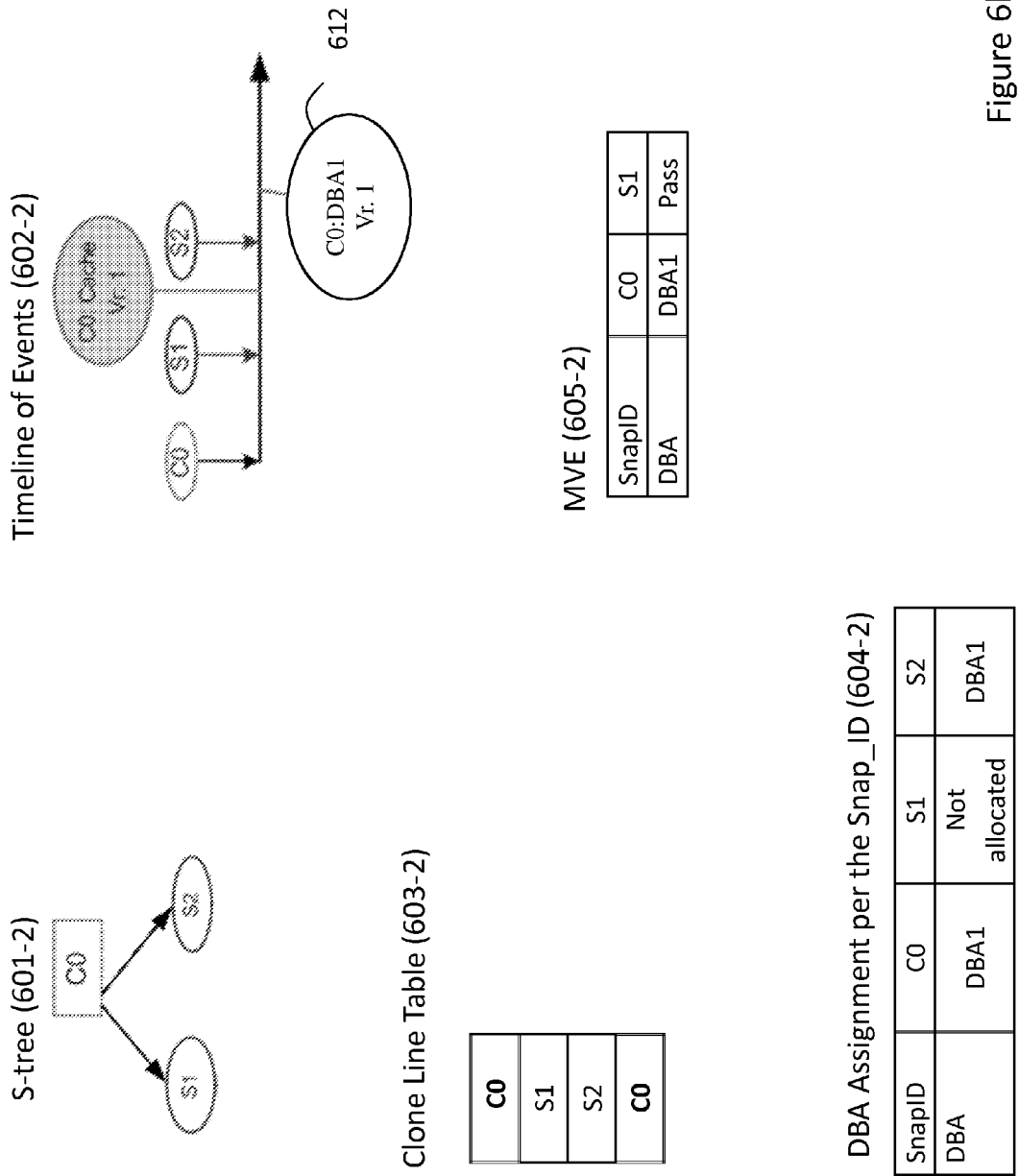

Referring to FIG. 6*b*, as illustrated in the timeline 602-2, data 611 cached in the cache memory has been destaged to the physical address range DBA1 (event 612: destage (C0: DBA1, vr.1)). No changes have been provided in S-tree 601-2 and in clone line table 603-2. As illustrated in the mapping table 604-2, since C0 has been modified after creation of S1 and before S2 creation, there is no DBA assigned to S1, while S2 shares the same DBA1 range as the master volume C0. Accordingly, snapshot entry of the MVE data structure 605-1 does not comprise Snap_ID=2. C0 represents DBA1 for both the master volume as well as the omitted member S2. Since no data has been written to S1, the value corresponding to Snap_ID=1 is specified in the physical storage entry as "pass".

At the stage illustrated in FIG. 6*c*, after creating the snapshot S2, the control layer has received a new write request addressed to the master volume C0, and new data associated with Snap_version=2 has been written (not illustrated) to the cache memory and has been destaged to the physical address range DBA2 (event 613, destage (C0: DBA2, vr.2)). No changes have been provided in S-tree 601-3 and in clone line table 603-3. As illustrated in the mapping table 904-3, DBA assigned to C0 is changed to DBA2, while DBA assigned to S2 continues to be in DBA1. Since C0 and S2 no longer share the same DBA, C0 cannot represent the DBA for S2 and S2 has to be included in the MVE. Thus snapshot entry in MVE data structure 605-3 comprises value Snap_ID=2 with corresponding value DBA1 in the physical storage entry.

Figure 6D:
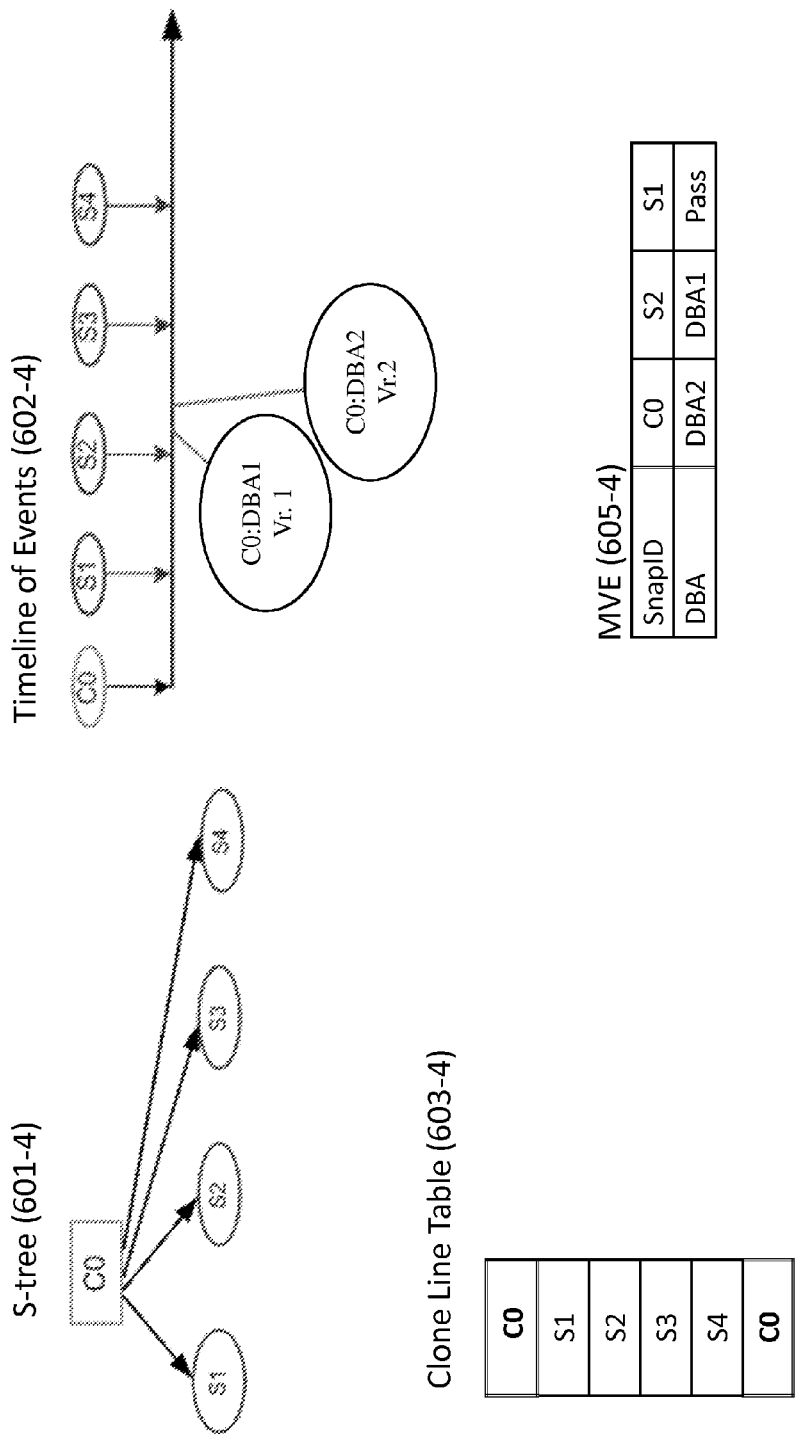

Referring to FIG. 6*d*, as illustrated in the timeline 602-4, new snapshots S3 and S4 have been created. S-tree 601-4 and clone line table 602-4 have been updated accordingly to present the newly created snapshots as direct children of the master volume C0. As illustrated in the mapping table 604-4, the new snapshots correspond to the same DBA2 range as the master volume C0. Accordingly, snapshot entry of the MVE data structure 605-2 does not comprise entries for Snap_ID=3 and Snap_ID=4, and respective snapshots can be looked up in accordance with the clone line. Thus, the MVE data structure is not modified, the newly created SF members are omitted in MVE and yet DBA2 range is represented in the MVE by the master volume C0.

Figure 6E:
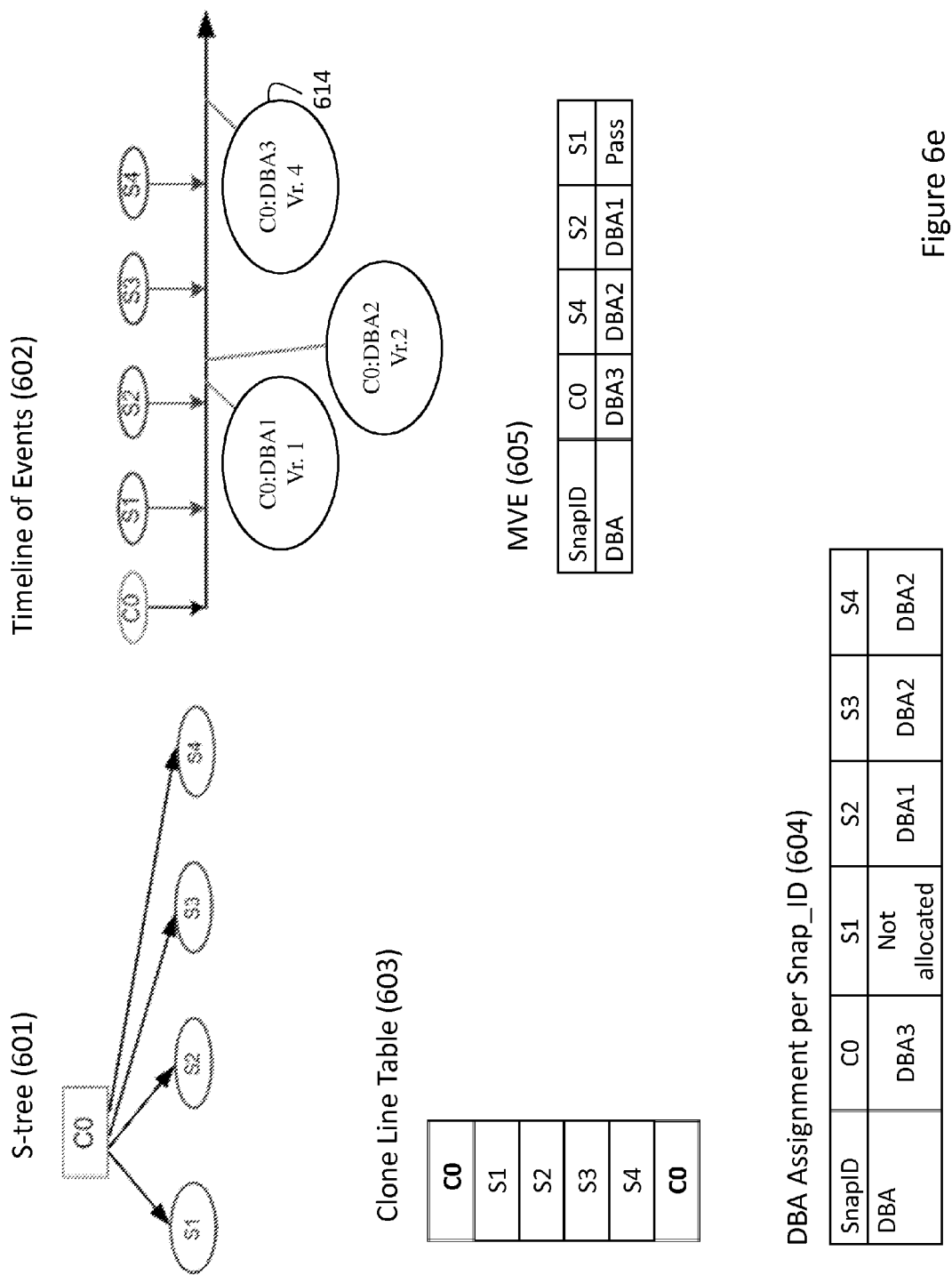

Referring to FIG. 6*e*, as illustrated in the timeline 602-5, after creating the snapshot S4, the control layer has received a new write request addressed to the master volume C0, new data associated with Snap_version=4 has been written (not illustrated) to the cache memory and has been destaged to the physical address range DBA3 (event 614, destage (C0: DBA3, vr.4)). No changes have been provided in S-tree 601-5 and in clone line table 603-5. As illustrated in the mapping table 604-5, DBA assigned to C0 is changed to DBA3, while S3 and S4 continue to share DBA2. Since C0 no longer shares DBA range with the snapshots S3 and S4, the snapshot entry in MVE data structure 605-5 comprises value Snap_ID=4 (among S3 and S4, the snapshot S4 is the latest in the clone line) with corresponding value DBA2 in the physical storage entry.

It is noted that snapshots with Snap_ID smaller or equal to Snap_version of a destage data are not affected by such destaging.

Figure 6F:
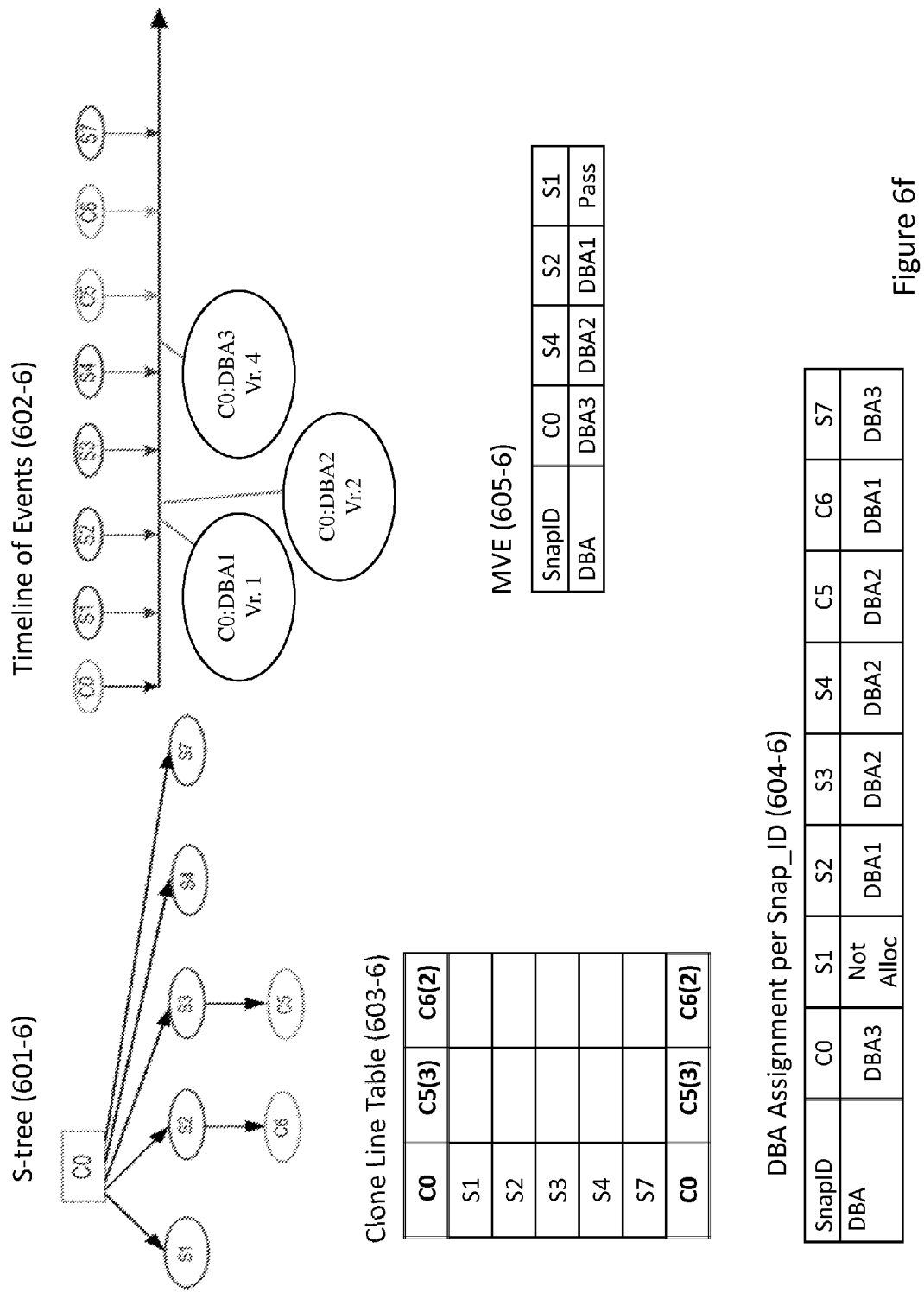

Referring to FIG. 6*f*, as illustrated in the timeline 602-6, new clones C5 and C6 and the read-only snapshot S7 have been created. The S-tree 601-6 and the clone line table 603-7 have been updated accordingly to present the newly created clone C5 as direct child of S3, clone C6 as direct child of S2 and the snapshot S7 as direct child of the master volume C0. C5 shares DBA2 range with its parent S3 and with S4. The value DBA2 in the physical storage entry of the MVE should have uniqueness representation, i.e. to correspond to one and only one Snap_ID among the members sharing the same DBA range. As presented by way of non-limiting example in MVE data structure 605-6, this only one member is selected among the sharing members as the last member in the earliest clone line, i.e. S4. When the control layer looks up and does not find C5 in the MVE, it looks for its parent S3. When S3 is also not found, the control layer searches down the clone line comprising S3 (i.e. the clone line with C0 as a parent clone) and finds S4 sharing the same DBA2 range with C5 and presented in the MVE.

The new clone C6 shares DBA1 with its parent S2, which is already represented in the MVE 605-6, thus need not be added to the MVE. Likewise, the new snapshot S7 shares DBA3 with its parent C0, which is already represented in the MVE 605-6, thus need not be added to the MVE data structure.

Referring to FIG. 6*g*, as illustrated in the timeline 602-7, after creating the clone C6 and before creating the snapshot S7, the control layer has received a new write request addressed to the clone C6, new data has been written (not illustrated) to the cache memory (bearing indication of Snap_version=6) and has been destaged to the physical address range DBA4 (event 615, destage (C6: DBA4, vr.6)) after creating the snapshot S7. No changes have been provided in S-tree 601-7 and in clone line table 603-7. As illustrated in the mapping table 604-7, DBA assigned to C6 is changed to DBA4. Accordingly, upon destaging, the snapshot entry in MVE data structure 605-7 is updated to include value Snap_ID=6 with corresponding value DBA4 in the physical storage entry.

Figure 6H:
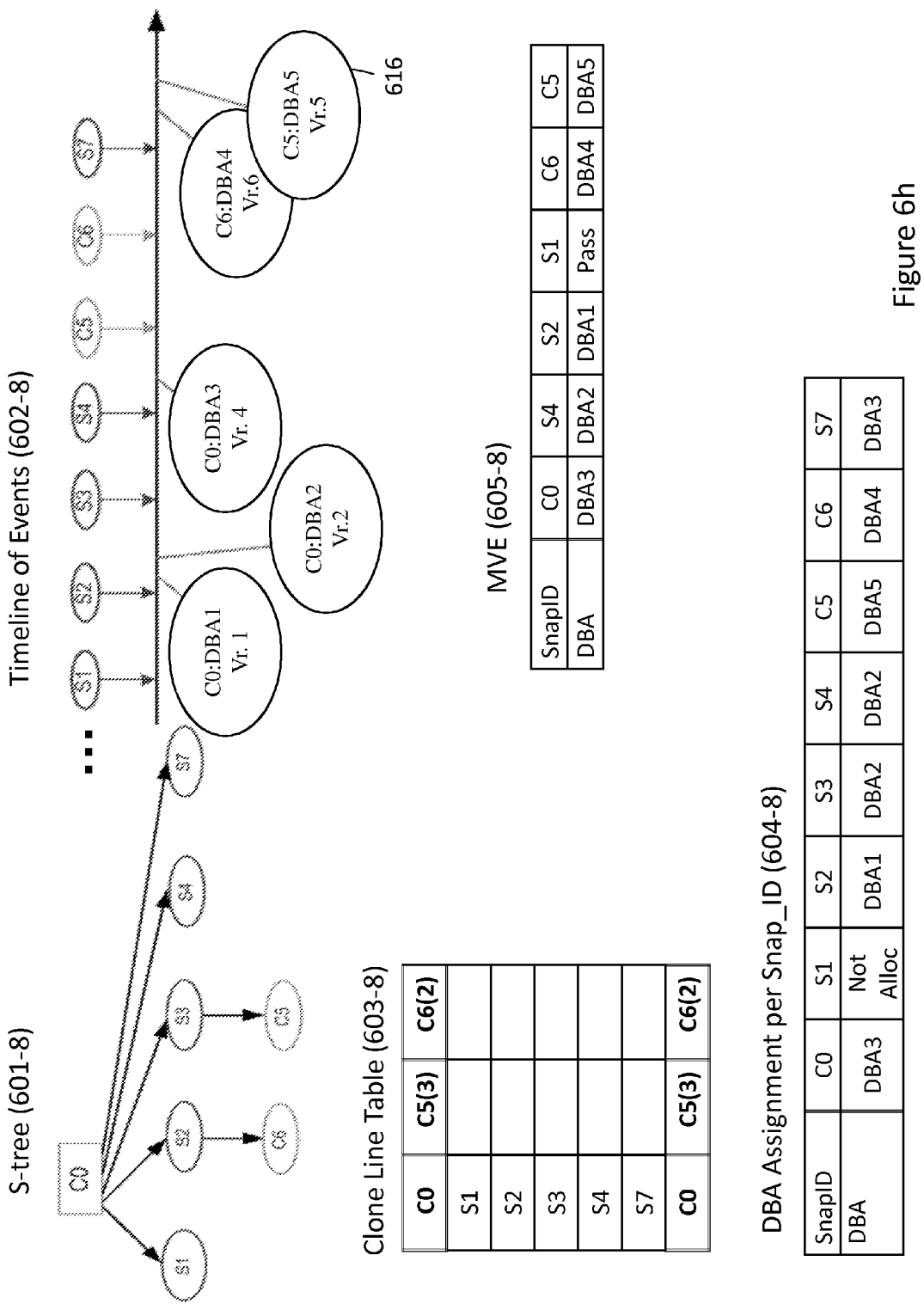

Likewise, as illustrated in FIG. 6*h*, after creating the clone C5 and before creating the clone C6, the control layer has received a new write request addressed to the clone C5, new data has been written (not illustrated) to the cache memory (bearing indication of Snap_version=5) and has been destaged to the physical address range DBA5 (event 616, destage (C5: DBA5, vr.5)) after creating the snapshot S7. No changes have been provided in S-tree 601-8 and in clone line table 603-8. As illustrated in the mapping table 604-8, DBA assigned to C5 is changed to DBA5. Accordingly, upon destaging, the snapshot entry in MVE data structure 605-8 is updated to include value Snap_ID=S with corresponding value DBA5 in the physical storage entry.

Referring to FIG. 6*i*, as illustrated in the timeline 602-9, upon creating the snapshot S3 and before creating the snapshot S4, the control layer has received a new write request addressed to the master volume C0, new data has been written (not illustrated) to the cache memory (bearing indication of Snap_version=3) and has been destaged to the physical address range DBA6 (event 617, destage (C0: DBA6, vr. 3)) after creating the snapshot S7. No changes have been provided in S-tree 601-9 and in clone line table 603-9.

As several snapshots have been created between writing data to the cache and destaging therefrom, the control layer needs to update the MVE 605-9 accordingly. The received write request can affect the members created after S3 and not modified before the destaging event 617, i.e. the snapshots S4 and S7. Accordingly, as illustrated in the mapping table 604-9, upon destaging, S4 and S7 share DBA6 with the master volume C0. Before the destage event 617, the snapshot S4 shared DBA2 with S3, and DBA2 was presented in the MVE 605-8 by Snap_ID=4. Since, upon the destage event 617, the snapshots S4 and S7 share DBA6 with the master volume (the latest element in the respective clone line), the snapshot entry in MVE data structure 605-9 is updated to exclude S4 and to include S3 as corresponding to the range DBA2.

As illustrated, the DBA range corresponding to S4 has been changed with no changes of S4. If an access request addressed to the snapshot S4 arrives before the destage event 617, the request will be served using DBA2 address range.

Figure 6J:
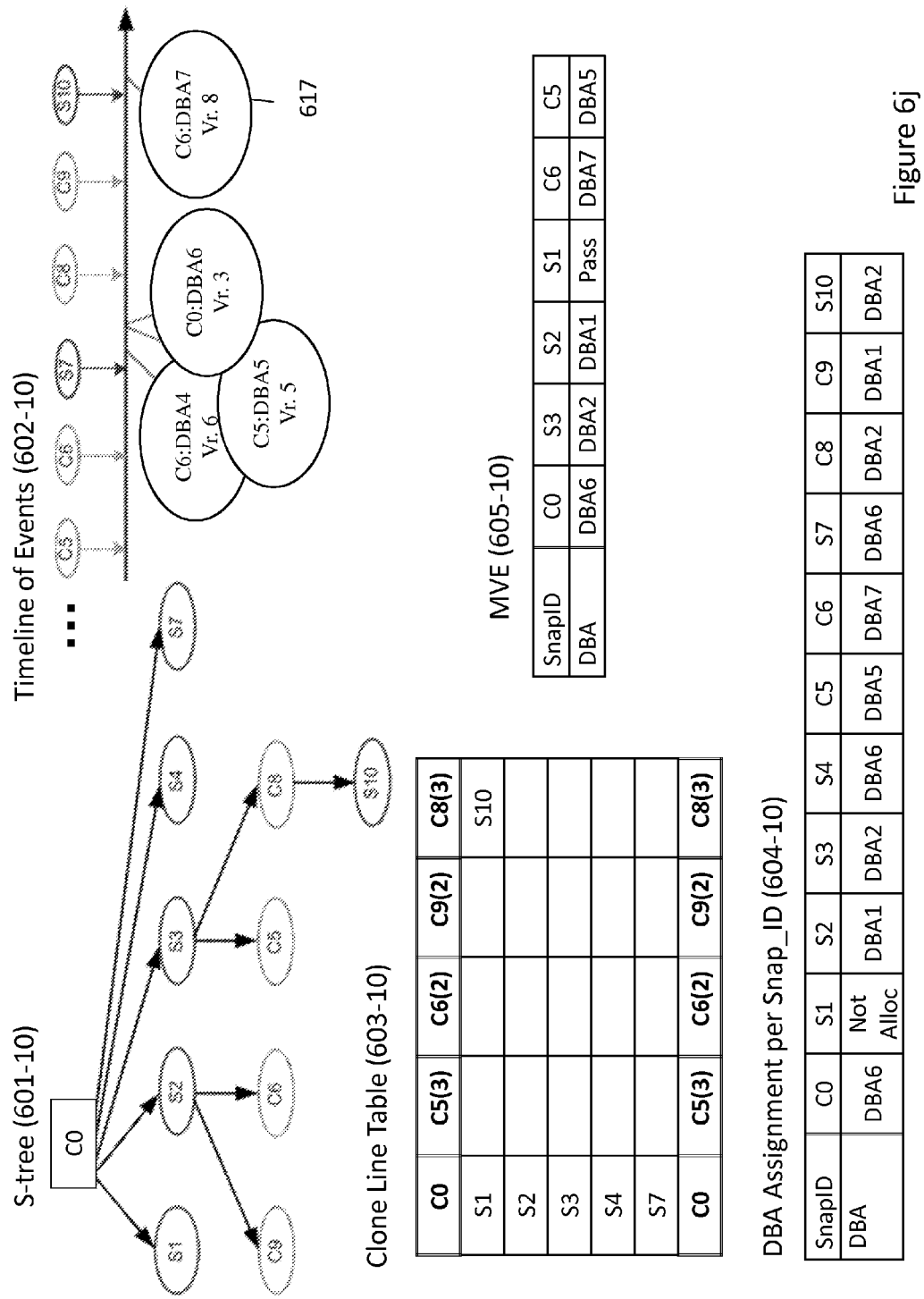

Referring to FIG. 6j, as illustrated in the timeline 602-10, new clones C8 and C9 and the read-only snapshot S10 have been created. The S-tree 601-10 and the clone line table 603-10 have been updated accordingly to present the newly created clone C8 as direct child of S3, clone C9 as direct child of S2 and the snapshot S10 as direct child of the clone C8. As presented in the mapping table, C8 shares DBA2 range with its parent S3 and with its child S10; C9 shares DBA1 range with S2. Upon creating the clone C8 and before creating the clone C9, the control layer has received a new write request addressed to the clone C6, new data has been written (not illustrated) to the cache memory (bearing indication of Snap_version=8) and has been destaged to the physical address range DBA7 (event 618, destage (C6: DBA7, vr. 8)) after creating the snapshot S10. Accordingly, the physical storage entry of the MVE 605-10 is updated so that the value Snap_ID=5 in the snapshot entry corresponds to the value DBA7. Since there is no member corresponding to the range DBA4, this range can be discarded and deleted from the MVE.

SF mapping data structure and elements thereof are updated responsive to different destaging event as, for example, destaging data received in a write request, destaging data in conjunction with snapshots removal, restoring or un-mapping, etc. Thus, among advantages of certain embodiments of the presently disclosed subject matter is independent, whilst coordinated, management of activities within a cache and activities related to the cache.

Figure 7A:
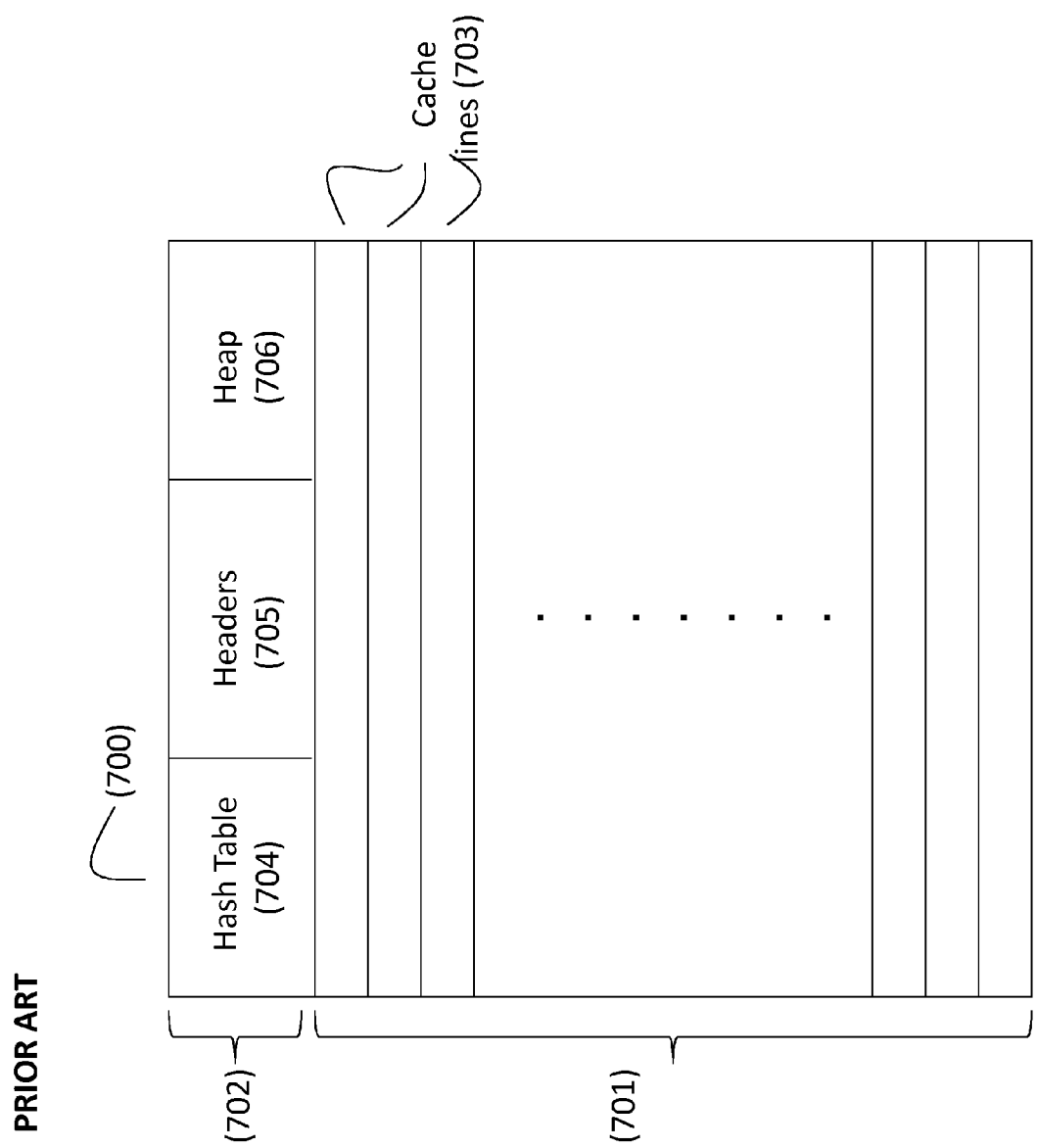
FIGS. 7a and 7b illustrate a non-limiting example of a known in the art cache memory usable for certain embodiments of the currently presented subject matter.
Figure 7B:
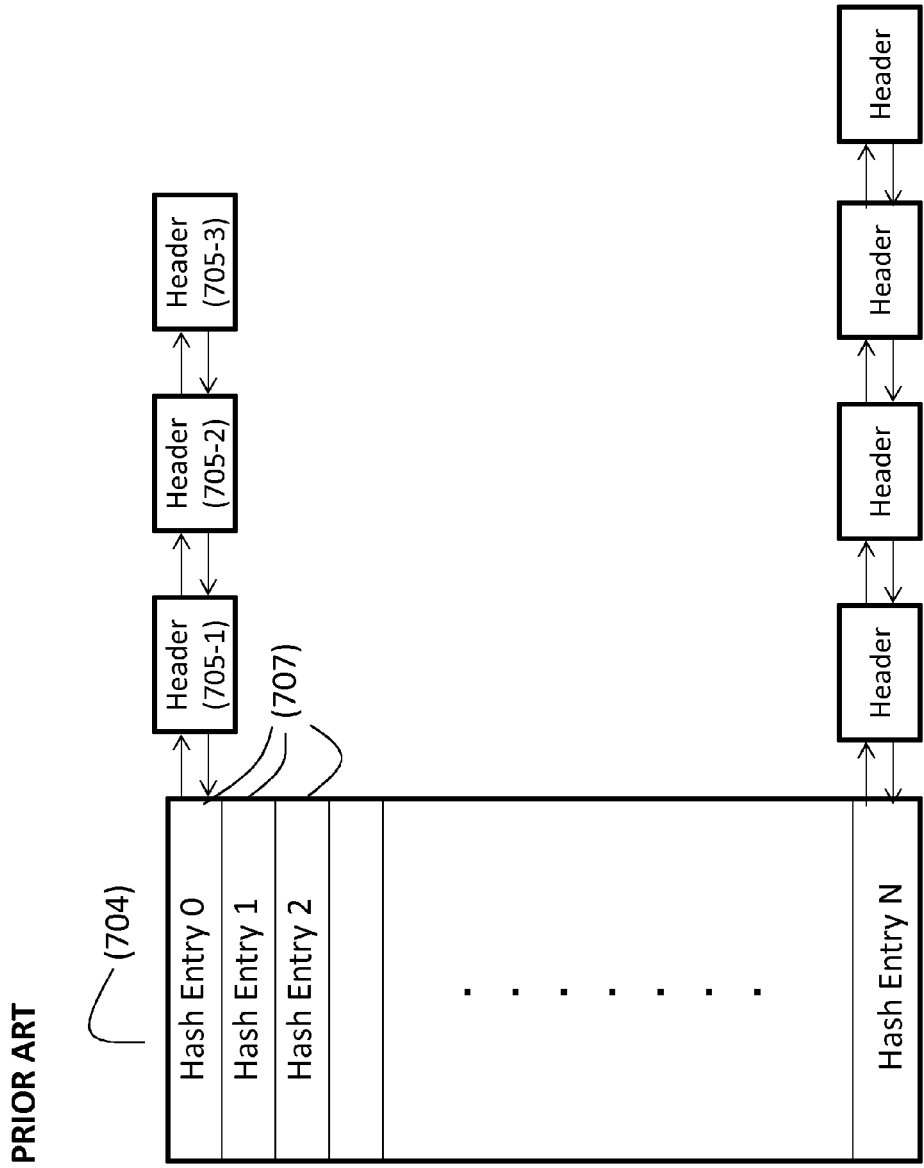

FIGS. 7a and 7b illustrate a non-limiting example of a known in the art cache memory usable for certain embodiments of the currently presented subject matter. Cache memory 700 comprises at least two distinct sections, a cache data section 701 and a cache directory section 702. The cache data section 701 is further organized into a number of cache lines 703, which contain data blocks transferred from or to be transferred into storage devices. The cache lines have equal length.

Cache directory section 702 is used to manage the cache and includes hash table 704, headers 705 and heap 706. The cache directory section comprises data indicative of LBA and volume corresponding to data blocks in the cache lines as well as the status of these data blocks. Hash table 704, in conjunction with headers 705, is used to determine whether a particular data block is contained within the cache at a given time. Heap 706, in conjunction with the headers, is used to identify a cache line that is a best candidate for replacement, when a cache miss occurs.

The hash table (bucket table) 704, is an array of hash entries 707 with each entry associated with a separate chain of linked headers. Each entry in the hash table points to a corresponding first header 705-1 in a doubly-linked chain of headers illustrated as 705-2 and 705-3. Each of the headers has a one-to-one association with a particular cache line contained within the cache. Hash functions usable for the hash table 704 shall output only a single index.

Each header in the linked chain comprises a forward pointer, which points to a next header in the chain and a backward pointer which points to a previous header in the list (or the hash table if the header is the first in the chain). Each header comprises a Volume Identifier indicative of a logical volume corresponding to respective data blocks, an Address Identifier indicative of a block number of the first block in the cache line, and Index Identifier indicative of an index into the heap for the cache line and Data Pointer indicative of address in the cache where the particular data block in the cache line is located. The header further comprises a Valid Bitmap, having, for each data block, one bit indicative of whether a particular data block is contained within a cache line. The header further comprises a Dirty Bitmap, having, for each data block, one bit indicative of whether a particular data block in the cache line is "dirty". The header can further comprise a Frequency Identifier identifying the number of times the particular cache line associated with the header has been accessed, a Timestamp Identifier identifying a time at which the cache line was last accessed, a Status Identifier indicative of whether the cache line is busy or free, etc.

Typically, determining whether a particular data block is located in the cache is provided as following: data indicative of a block number addressed in a read request is input to a hash function which produces as output an index into a hash table. The chain of headers corresponding to the respective entry is looked up for a header corresponding to the requested data block. If none of the headers in the chain comprise the respective identifier, a cache miss has occurred. If a header with respective identifier is found, Valid Bitmap is examined to determine whether the requested data block is presently within the cache. If the block is comprised in the Valid Bitmap, then a cache hit has occurred.

Those versed in the art will readily appreciate that the teachings of the presently disclosed subject matter are not bound by the cache memory structure and hit/miss search technique illustrated in FIGS. 7a and 7b.

Figure 8:
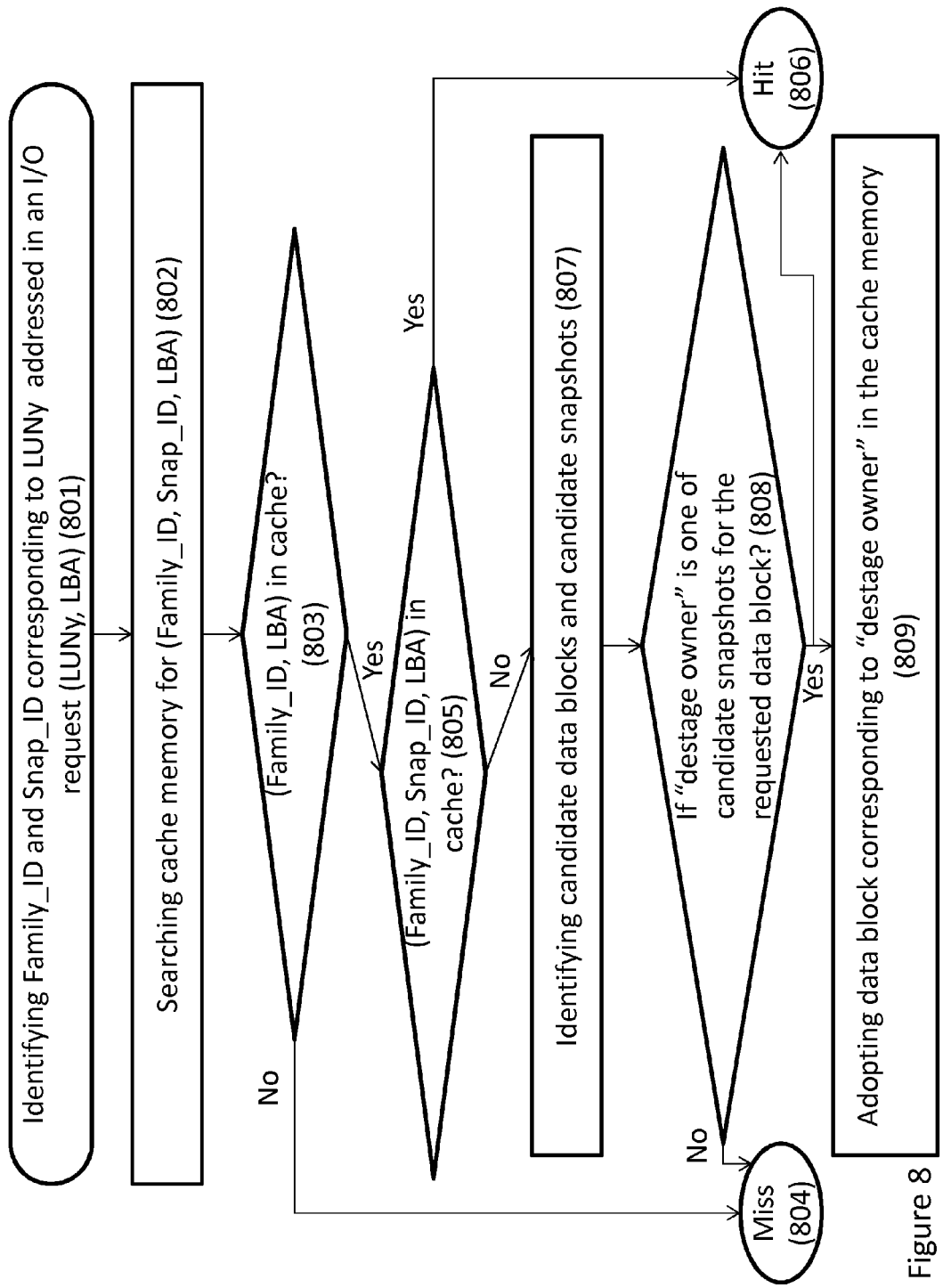
FIG. 8 illustrates a generalized flow chart of searching a cache memory when servicing a read request addressed to an LBA associated with a snapshot family member.

FIG. 8 illustrates a generalized flow chart of searching the cache memory when servicing a read request addressed to an LBA associated with a snapshot family member.

In the presence of snapshots it is possible that a given data block requested in association with a certain snapshot is not within the cache, while the cache memory comprises one or more data blocks corresponding to the same LBA as the requested data block, but associated with some other member(s) of the snapshot family. Some of these data blocks can comprise the same data as the given requested data block and can be used, instead of the given requested data block, by a "read" operation from the cache memory. Thus, "hit or miss" decision requires additional considerations in a case when the cache memory misses data required by access request addressed to a member of a snapshot family. There is a need to recognize what other SF member(s), if any, holds the addressed data and to adopt the data from such recognized SF member(s) in the cache with no need of cache scanning or reading from disk. In accordance with certain embodiments of the presently disclosed subject matter, the control layer is configured to provide "hit or miss" cache operation considering the snapshots structure.

As was detailed with reference to FIG. 5, each snapshot family is provided with a corresponding SFM data structure. Upon receiving a read request (LUNy, LBAx) addressed to a snapshot family member corresponding to LUNy, the control layer (e.g. using the snapshot management module 105) identifies (801) Family_ID and Snap_ID corresponding to the addressed LUNy.

In accordance with certain embodiments of the presently disclosed subject matter, the cache directory section comprises data indicative of Family_ID, Snap_ID and LBA corresponding to data blocks in the cache lines as well as Snap_version and status of these data blocks. The cache directory can be configured in a manner that entries in the hash table are characterised by Family_ID and LBA, and headers comprise (Family_ID, Snap_ID, LBA) and Snap_version identifiers associated with respective data blocks. All headers comprising the same Family_ID and LBA (i.e. corresponding to data blocks with the same LBA and associated with SF family members with different Snap_ID and/or Snap_version) are chained together and associated with hash entry corresponding to the LBA. The hash entry can be configured to correspond to a single LBA or to a range of contiguous logical addresses. By way of non-limiting example, the hash entries can correspond to entries in the SF mapping structure (e.g. to the entries 401-1-401-$k$ corresponding to variable-length ranges of contiguous logical addresses within the SF logical address space).

Upon translating the received read request (LUNy, LBAx) into (Family_ID, SnapID, LBA), the control layer (e.g. the cache management module 107) searches (802) the cache memory for a data block corresponding to (Family_ID, SnapID, LBA).

The control layer first searches (803) for hash entry (Family_ID, LBA). If hash entry (Family_ID, LBA) is not found, a cache miss has occurred (804). If hash entry (Family_ID, LBA) is found, the control layer further searches (805) for a header comprising (Family_ID, SnapID, LBA). If the searched header is found, a cache hit has occurred (806). If hash entry (Family_ID, LBA) is found, but header with (Family_ID, SnapID, LBA) is missing in the respective chain of headers associated with the hash entry, further check is provided, as the requested data may be comprised in the cache memory in association with another one or more SF members sharing data with the requested SF member.

The control layer (e.g. the cache management module) identifies (807) all dirty data blocks in the cache memory characterized by the requested (Family_ID, LBA) and SF members (Snap_IDs) corresponding to these identified data blocks, such data blocks are referred to hereinafter as candidate data blocks and such SF members are referred to hereinafter as candidate SF members. In cache directory configured as detailed above with reference to FIG. 8, all respective headers are associated with hash entry (Family_ID, LBA).

As will be further detailed with reference to FIGS. 9-10, the control layer further identifies one or more SF members which would represent the addressed data block in MVE if all candidate data blocks would be currently virtually destaged from the cache. Such SF members (i.e. a SF member(s) representing the addressed physical data upon virtual destaging all candidate data blocks) are referred to hereinafter as a "destage owner(s)" and denoted as Snap_ID$_{DO}$. The term "virtual destaging" should be expansively construed to cover any kind of simulating or other modeling of destage process without actual assigning of physical addresses for the respective data blocks and without actual writing to physical address space. Processing required for virtual destaging can be provided by cache management module.

For purpose of illustration only, the following description is provided for MVE data structure characterized by uniqueness of representing a given DBA by one and only one snapshot family member and, thus, comprising, upon each destage, a single Snap_ID$_{DO}$ representing, at the point-in-time, DBA corresponding to the addressed (Family_ID, Snap_ID, LBA). Those skilled in the art will readily appreciate that the teachings of the present disclosure are applicable in a similar manner to MVE data structures comprising more than one SF member representing the given DBA.

The control layer further checks (808) if the destage owner of the requested LBA is one of the candidate SF members. If the cache comprises data block associated with the destage owner, the case is considered as cache hit (806). If not, the case is considered as cache miss (804), although data blocks can be comprised in the cache but in association with SF member other than the "destage owner".

Cache hit is followed by modifying the cache directory to adopt (809) the data block associated with the "destage owner" as the addressed data block (Family_ID, Snap_ID, LBA). By way of non-limiting example, the adoption procedure can include:

creating a new header corresponding to the requested data block (Family_ID, Snap_ID, LBA);
including the new header in the chain corresponding to (Family_ID, LBA) hash entry;
replicating Dirty Bitmap of the "destage owner" header to the new generated header;
increasing the counters of the hash table entry to indicate that the respective chain also includes the new generated header.

Thus, the header corresponding to data block (Fam_id, SnapID, LBA) is now pointed by the respective entry in the cache hash table and the respective data block can be read from the cache whilst preserving consistency across snapshots, cache and permanent storage.

It is noted that a process (809) of adopting the data block in the cache memory is not bound by the operations detailed above, and can be provided in any appropriate manner known in the art.

Operations 801-803, 805, 807-809 can be provided by the cache management module.

Figure 9:
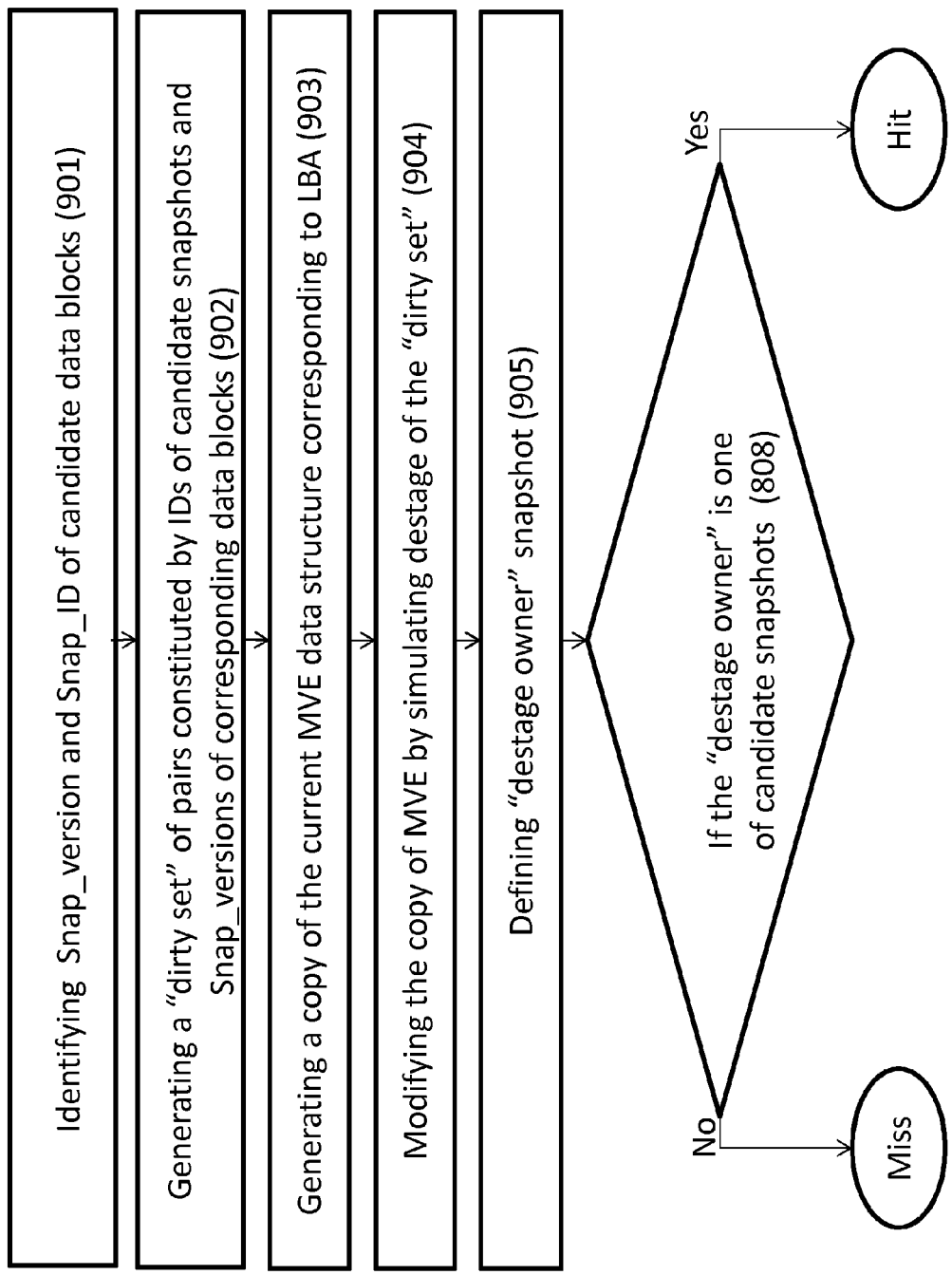
FIG. 9 illustrates a generalized flow chart detailing the process of determining if a candidate data block hits a read request.

Referring to FIG. 9, there is illustrated a generalized flow chart detailing the process of determining if a candidate data block (i.e. data block in cache memory corresponding to the requested LBA but associated with other than requested SF member) hits an access request. In accordance with certain embodiments of the presently disclosed subject matter, upon identifying in the cache memory all candidate data blocks (i.e. dirty data blocks characterized by the requested (Family_ID, LBA)), the control layer identifies (901) for each candidate data block its corresponding Snap_version and Snap_ID. The control layer further generates (902) a "dirty set" comprising the pairs of (Snap_ID, Snap_version) identified with respect to each of the candidate data blocks.

By way of non-limiting example, the cache management module can search the hash table entry (Family_ID, LBA) for all headers with Dirty Bitmap comprising bits indicative of the presence of data blocks corresponding to the requested LBA, and can further extract from the identified headers Snap_ID and Snap_version corresponding to the respective dirty data blocks.

The control layer generates (903) a copy of the current MVE data structure corresponding to the requested LBA. As will be further detailed with reference to FIG. 10, the control layer modifies (904) the generated MVE copy by simulating destage of the data blocks corresponding to the "dirty set", and defines (905) "destage owner" SF member. During the simulation, the data blocks corresponding to different SF members in the "dirty set" can be virtually destaged in any order, whilst providing the MVE modification regarding the respective Snap_versions. Thus, the provided simulation keeps consistency of mapping between the logical and physical addresses in the presence of snapshots.

The control layer further compares (906) the defined "destage owner" SF member with candidate SF members. If one of the candidate SF members is the "destage owner" for the requested data block (i.e. the "dirty set" comprises Snap_ID$_{DO}$), then there is the case of cache hit, if the "dirty set" does not comprise Snap_ID$_{DO}$, then there is the case of cache miss.

Operations 903-906 can be provided by the snapshot management module in cooperation with the cache management module.

Figure 10:
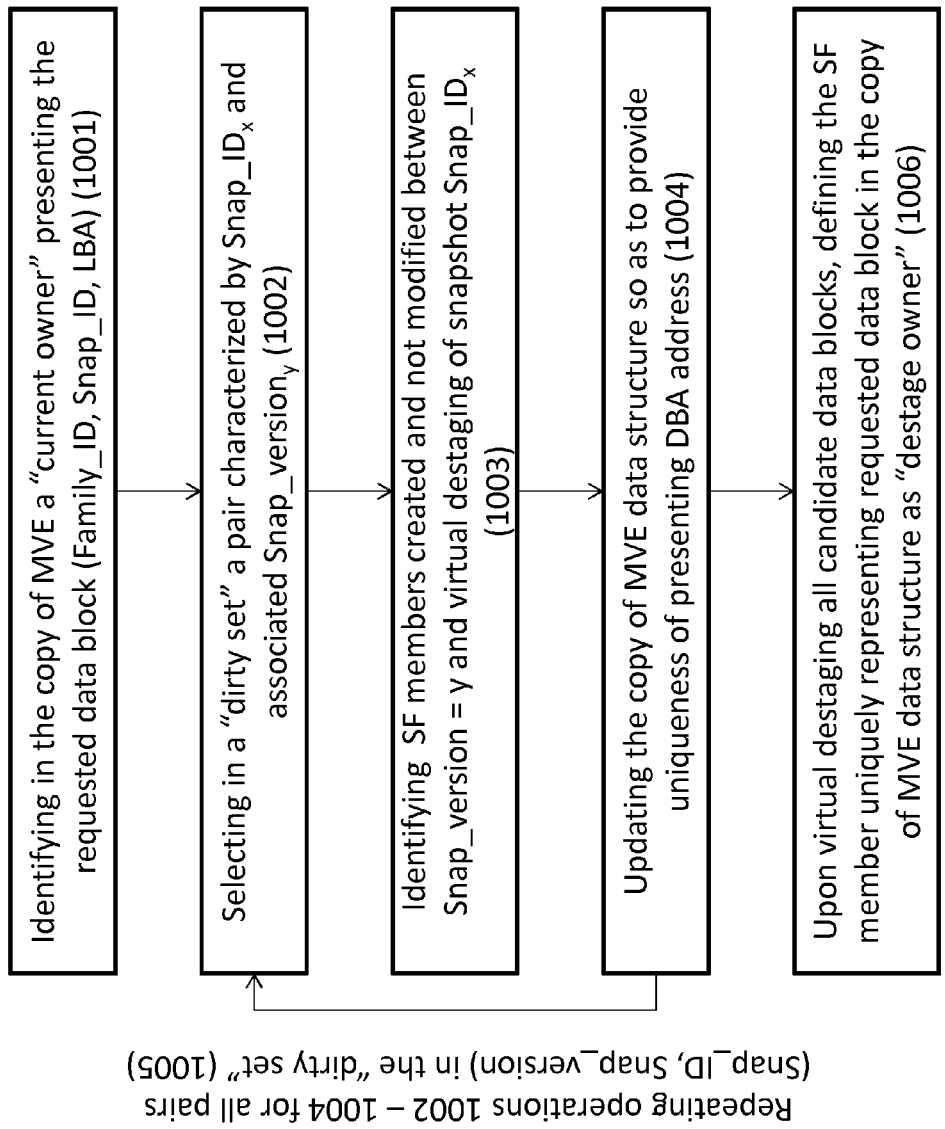
FIG. 10 illustrates a generalized flow chart of defining the "destage owner" SF member.

Referring to FIG. 10, there is illustrated a generalized flow chart of defining the "destage owner" SF member in accordance with certain embodiments of the presently disclosed subject matter.

The control layer identifies (1001) in the copy of MVE a Snap_ID of SF member representing the requested data block (Family_ID, Snap_ID, LBA), such member referred to hereinafter as a "current owner".

The control layer selects (1002) in the "dirty set" a pair (Snap_ID$_x$, and Snap_version$_y$) and modifies the copy of MVE as if data block corresponding to the selected pair were destaged to the address corresponding to the current owner (virtual destage event).

For the selected pair, the control layer uses S-tree (and/or clone line table) to identify (1003) the SF members which would be created and not modified between Snap_version$_y$ and the virtual destaging event. The control layer further identifies, among them, the candidate SF members and the SF members represented by the current owner. The control layer updates (1004) the copy of MVE data structure so as to provide uniqueness of representing DBA address represented in the current owner. Updating the MVE copy data structure responsive to virtual destage event is provided in a manner similar to the illustrated in FIGS. 6a-6j non-limiting examples of updating MVE data structure responsive to the real destaging.

Upon repeating (1005) operations 1002-1004 for all pairs (Snap_ID, Snap_version) in the "dirty set", the control layer defines (1006) the destage owner, i.e. the SF member uniquely representing the requested data block (Family_ID, Snap_ID, LBA) in the copy of MVE data structure after all candidate data blocks are virtually destaged.

As well known in the art, storage devices can be configured to support write-in-place and/or write-out-of-place techniques. In a write-in-place technique modified data is written back to its original physical location on the disk drive, overwriting the older data. In contrast, a write-out-of-place technique writes (e.g. in log form) a modified data block to a new physical location in the storage space. Thus, when data is modified after being read to a cache memory from a location on a disk drive, the modified data is written to a new physical location so that the previous, unmodified version of the data is retained, but the reference to it is typically deleted, the storage space at that location therefore becoming free for reuse. A non-limiting example of the write-out-of-place technique is the known write-anywhere technique, enabling writing data blocks to any available physical storage address without prior allocation.

It is noted that the process of defining the "destage owner" is detailed in FIG. 10 for embodiments implementing write-out-of-place technique. Teachings of the presently disclosed subject matter are applicable in a similar manner also to embodiments implementing write-in-place technique, however destage simulation for each candidate data block shall be provided in accordance with DBA address corresponding to respective candidate in the copy of MVE.

It is noted that all operations detailed with reference to FIGS. 8-10 are provided with no need in allocating physical addresses and/or real destaging of the candidate data blocks. The operations can be provided by a processor operating in conjunction with the cache management module and the snapshot management module, the processor using a copy of respective MVE stored in a memory operating in conjunction with the processor. Upon defining the "destage owner", the copy of MVE can be deleted from the memory. The processor and/or the memory can be part of the functional modules involved in the operations.

Among advantages of certain embodiments of the currently presented subject matter is consistency of mapping between logical and physical addresses in the presence of snapshots, thus enabling consistency across snapshots, cache memory and permanent storage.

In the presence of snapshots, it is also possible that a given dirty data block overwritten during a write operation is relevant to other SF members and, thus, required additional considerations before discarding. The detailed above technique of identifying the destage owners and adopting respective data blocks in the cache memory can be applicable also for write operations in the presence of snapshots.

Responding to read requests using the relationships between members of a snapshot family Different members of a snapshot family may have the same content associated with same logical addresses. For example, immediately after the creation of a certain snapshot of a logical volume, the content of the snapshot and the logical volume is identical. This can assist in responding to read requests even when a requested data entity is not cached.

A method for snapshot family based reading of data units from a storage system is provided. If a requested data entity is the subject of a read request then a matching data entity is searched in the cache. If failing to find a matching data entity (cache miss) then the method proceeds to finding one or more relevant data entity candidates (stored in the storage system—can be in the cache memory or in a permanent memory), selecting a relevant data entity and providing the relevant data entity.

When the destaging process can be executed out-of-order so that the permanent memory module can store one or more versions of a data entity that are newer than one or more other versions of the data entity that are cached. There is a need to search for the relevant data entity while taking into account the out-of-order nature of the de-staging process. This can be done by simulating the destaging process or without such simulating.

Finding relevant data entity candidates using virtual destaging

Figure 11:
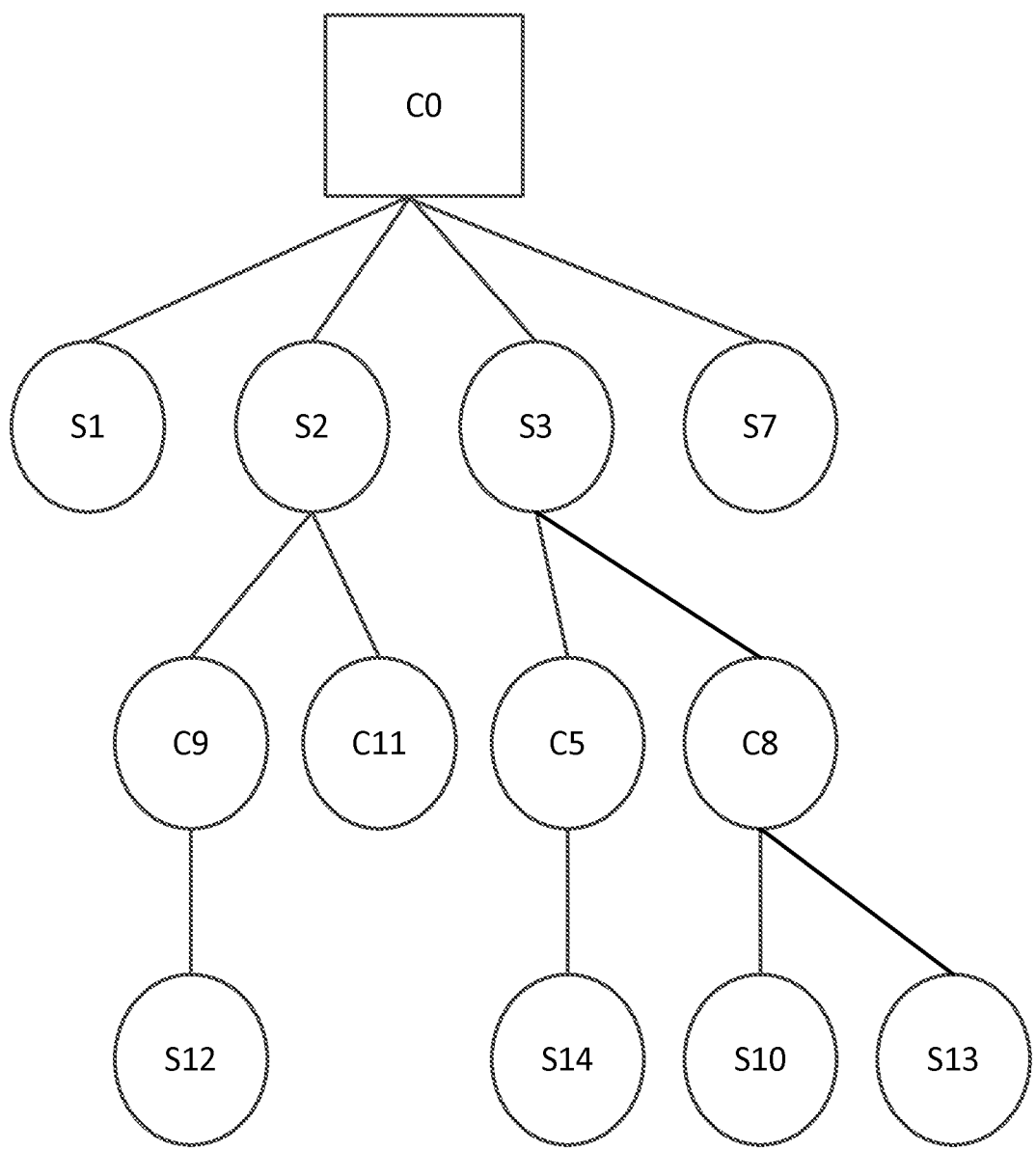
FIG. 11 illustrates an S-tree of a certain snapshot family according to an embodiment of the invention.

FIG. 11 illustrates an S-tree 1100 of a certain snapshot family according to an embodiment of the invention. The certain snapshot family include a root (C0), five first level read only snapshots S1, S2, S3 and S7, five second level writable snapshots (clones) C9, C11, C5 and C8, and four third level read only snapshots S12, S14, S10 and S13. S2 is the parent of C9 and C11. S3 is a parent of C5 and C8. C9 is a parent of S12. C5 is a parent of S14. C8 is a parent of S10 and S13. The numbers of these snapshots (writable or non-writable) represents their order of creation. It is assumed that snapshots S4 and C6 were created and then deleted.

The following table illustrates a clone line database:

| C0 | C5(3) | C9(2) | C8(3) | C11(2) |
|----|-------|-------|-------|--------|
| S1 | S14   | S12   | S10   |        |
| S2 |       |       | S13   |        |
| S3 |       |       |       |        |
| S7 |       |       |       |        |
| C0 | C5(3) | C9(2) | C8(3) | C11(2) |

The following table illustrates an assignment of VDAs to the certain snapshot family:

| SnapID | C0 | S1 | S2 | S3 | C5 | S7 |
|---|---|---|---|---|---|---|
| VDA | VDA6 | Not allocated | VDA1 | VDA2 | VDA5 | VDA6 |

| SnapID | C8 | C9 | S10 | C11 | S12 | S13 | S14 |
|---|---|---|---|---|---|---|---|
| VDA | VDA8 | VDA1 | VDA2 | VDA2 | VDA1 | VDA8 | VDA5 |

The following table provides an example of a compressed representation:

| SnapID | C0 | S3 | S2 | S1 | C5 | C8 | S10 |
|---|---|---|---|---|---|---|---|
| VDA | VDA6 | VDA2 | VDA1 | Pass | VDA5 | VDA8 | Pass |

But this is less important, since what we are interested in is in the assignment.

Assume now that in cache we have for the same (fam_idx, LBAy), the following dirty data entities:

(fam_idx, C8, LBAy): data DD1 with version 10
(fam_idx, C9, LBAy): data DD1 with version 13

Now, assuming that the storage system receives a read request for (fam_idx, S13, LBAy).

In metadata reflecting the content of the cache memory there is information about the pair of dirty data entities that may be dirty relevant data entity candidates.

The storage system may perform a virtual destage by virtual destaging the two dirty relevant data entity candidates.

So, for instance, virtually destage first at (fam_idx, C8, LBAy), data DD1 with version 10.

In the non-virtual destage scenario, the destage mechanism usually does the following:

1. assign a new VDA to the destaged section, in this case VDA10 to C8
2. Reassign accordingly VDAs to other snaps in the family that supposed to share the destaged section. In this case S13 is reassigned with VDA10. Data related with it will have to be read now from there
3. Write DD1 to VDA10

The assignment table will look now as follows:
The following table illustrates an assignment of VDAs to the certain snapshot family:

The following table provides an example of a compressed representation:

| SnapID | C0 | S3 | S2 | S1 | C5 | C8 | S10 |
|---|---|---|---|---|---|---|---|
| VDA | VDA6 | VDA2 | VDA1 | Pass | VDA5 | VDA10' | Pass |

In the virtual destage, the writing of DD1 to VDA10 (step 3) is not performed, and instead of a new VDA, such as VDA10' that may be an artificial physical address that indicates that an actual destage was not done. VDA 10' may belong to an address space that is not used for storing data.

It is noted that when executing step 2 in the virtual destage mechanism, the storage system knows that S13 is reassigned to the same name as C8. It is noted that the virtual destage may not even include allocating VDA10' according to a physical allocation process used for allocating physical addresses to destaged data units. The virtual destage may include identifying C8 as not being actually destaged. VDA10' can be a simulation dedicated value that differs from VDAs used for actually storing data entities.

In the next step we virtual-destage (fam_idx, C9, LBAy): data DD1 with version 13.

With the same logic as used during the virtual-destage of C8, the storage system gets the following new assignment table and reduced table:

The following table illustrates an assignment of VDAs to the certain snapshot family:

| SnapID | C0 | S1 | S2 | S3 | C5 | S7 |
|---|---|---|---|---|---|---|
| VDA | VDA6 | Not allocated | VDA1 | DVA2 | VDA5 | VDA6 |

| SnapID | C8 | C9 | S10 | C11 | S12 | S13 | S14 |
|---|---|---|---|---|---|---|---|
| VDA | VDA10' | VDA1 | VDA8 | VDA2 | VDA1 | VDA10' | VDA5 |

| SnapID | C0 | S1 | S2 | S3 | C5 | S7 |
|--------|------|---------------|------|------|------|------|
| VDA | VDA6 | Not allocated | VDA1 | DVA2 | VDA5 | VDA6 |

| SnapID | C8 | C9 | S10 | C11 | S12 | S13 | S14 |
|--------|-------|-------|------|------|------|--------|------|
| VDA | VDA10' | VDA11 | VDA8 | VDA2 | VDA1 | VDA10' | VDA5 |

The following table provides an example of a compressed representation:

| SnapID | C0 | S3 | S2 | S1 | C5 | C8 | S10 | C9 | S12 |
|--------|------|------|------|------|------|------|--------|--------|------|
| VDA | VDA6 | VDA2 | VDA1 | Pass | VDA5 | VDA10' | VDA8 | VDA11' | Pass |

But since the two steps were virtual, just imagine VDA10' and VDA11' instead of VDA10 and VDA11 respectively. The virtual destage indicates that the (virtual) owner of the data of S13 is (virtually) C8. This is what the table says, even though no real VDA was assigned and no data was written to the disks. Indeed the virtual destaging does not even change the original table or MVL, and the storage system may just copy it aside and modify this copy (which can later just be discarded).

After obtaining the second table (or MVL) the storage system knows who is the owner of the data that needs to be retrieved in response to the read request for (fam_idx, S13, LBAy): this is (fam_idx, C8, LBAy)

Hence, the request is completed by retrieving DD1—which is the content of the selected relevant data entity—the cached content of C8.

Finding relevant data entity candidates without virtual destaging

In the following description the following terms are being used:

Written version—a version that is associated with each cached data entity to indicate the version of the most recent snapshot existed at the time of the caching.

Creation version—a version of a member, e.g., S7 is a snapshot with creation version=7.

Requested member—a member whose data is requested to be read. It is assumed that the member is a certain snapshot of a certain snapshot family.

Checked member—a member whose cached data entity is checked for being relevant to the requested member.

Retrieving data for a read request directed to a certain requested member and logical address may include multiple steps.

First of all, the cache memory is searched for a matching cached data entity—a cached data addressed to the requested member and logical address.

If no matching cached data entity is found in the cache memory, members of the certain snapshot family that are related to the requested member will be checked for finding relevant data entity candidates, in a predetermined order until relevant cached data is found, taking into account: (i) the (hierarchical) family relation between the checked member and the requested member and (ii) the written version (indicative of timing or timing relationship) of the cached data. Factors (i) and (ii) can be processed (by applying any function) to provide a priority (or probability) to that relevant data entity candidate.

If several members have the same priority with regard to their relation to the requested member (hierarchical relationship), then highest priority is given to the member that caches data associated with the most recent written version, excluding a case where a member has cached data that is associated with a written version that is higher than the creation version of requested member, as such a written version cannot influent the requested member. In addition, some of the members are irrelevant in this search as they cannot influent the requested member, for example members that are not part of the branch that includes the requested member. Suppose a read request is received for reading LBAx of C11 that belongs to a snapshot family represented by the tree in FIG. 12 and the clone line table of FIG. 13.

Figure 12:
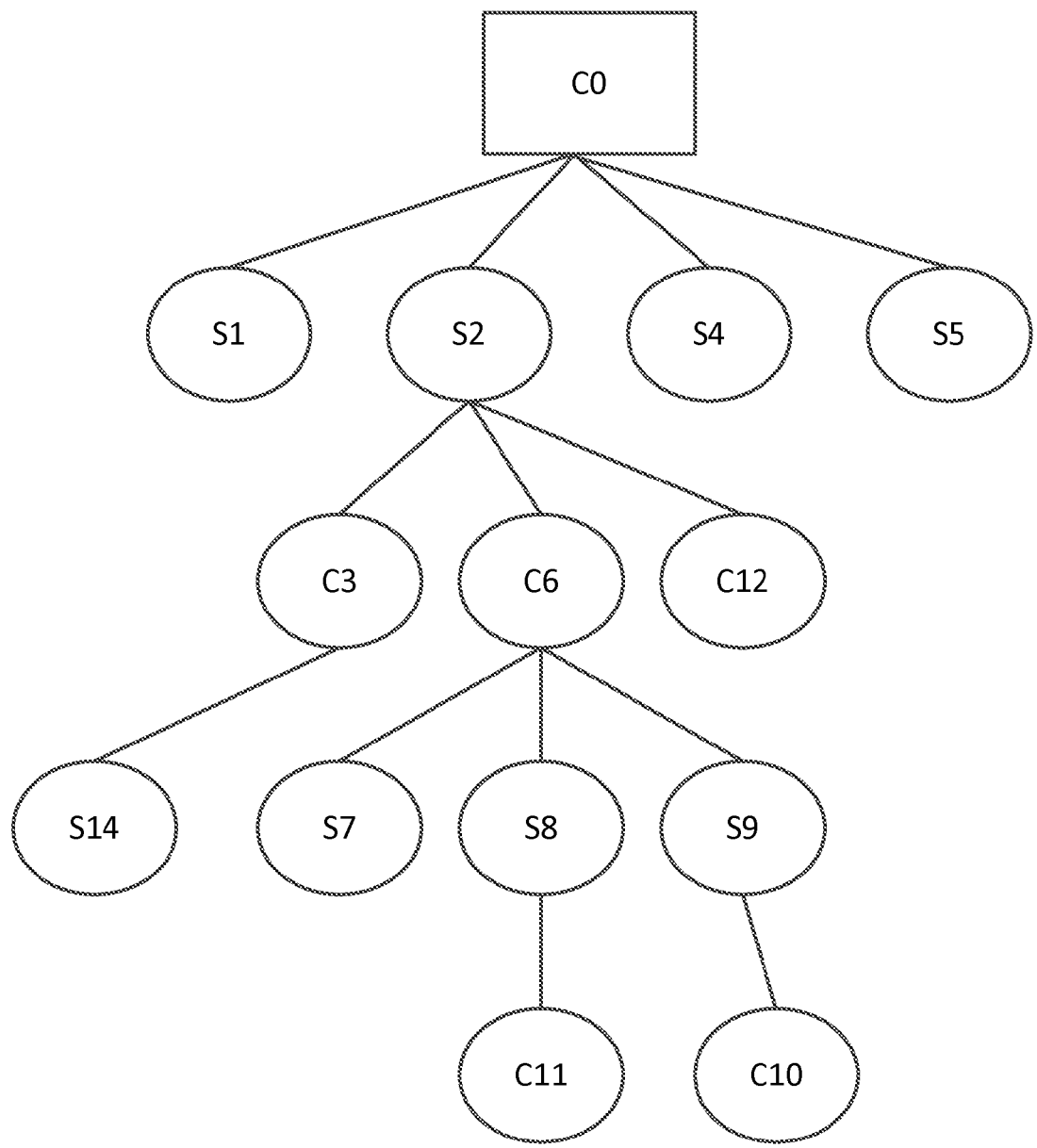
FIG. 12 illustrates an S-tree of a certain snapshot family according to an embodiment of the invention.

FIG. 12 illustrates an S-tree 1200 of a certain snapshot family according to an embodiment of the invention. The certain snapshot family include a root (C0), four first layer read only snapshots S1, S2, S43 and S5, three second level writable snapshots (clones) C3, C6 and C12, four third level read only snapshots S14, S7, S8 and S9 and a pair of a forth level writable snapshots C11 and C10. C0 is the parent of S1, S2, S4 and S5. S2 is the parent of C3, C6 and C12. C3 is a parent of S14. C6 is a parent of S7, S8 and S9. S8 is a parent of C11. S9 is a parent of C10. The numbers of these snapshots (writable or non-writable) represents their order of creation. The following table (also shown in FIG. 13) illustrates a clone line database:

| C0 | C3(2) | C6(2) | C10(9) | C11(8) |
|----|-------|-------|--------|--------|
| S5 | S14   | S9    |        |        |
| S4 |       | S8    |        |        |
| S2 |       | S7    |        |        |
| S1 |       |       |        |        |
| C0 | C3(2) | C6(2) | C10(9) | C11(8) |

Assuming that there is no cached data for LBAx of C11, the search for relevant data entity candidates may be conducted in the following order:
 the direct parent (S8) is checked first.
 its younger siblings (in this case, only s9 is relevant).
 The next member in the search path is C6. Note that since C6 is a writable snapshot, it may have a cached data with version that is higher than the creation version of C11 (i.e. version 11) or higher than the creation version of S8 which is the originator of C11 and therefore may be irrelevant. Furthermore, the writable sibling of C6, i.e., C12 is also irrelevant, since as a writable member, it evolves independently from C11 and from its ancestor C6.

The next to be checked is the parent of C6, i.e., S2.

Afterwards the younger siblings (S5 and S4) of S2 are checked. It is likely that if both S4 and S5 have cached data, the written version associated with S5 is more recent than a written version of S4, therefore S5 is preferred. Alternatively, the written version of both siblings can be compared and the data with the latest version is chosen.

The traversing of the S-tree can include only the branches relevant to the requested member and may exclude some other branches.

The clone line table can be used for traversing the relevant parts of the tree. FIG. 14 illustrates the order in which the table is scanned. The bold larger font indicates scanned members. It is shown that there are clone lines that are skipped. These clone lines indicates branches that are not relevant to the requested member. For example, the branch with C3 as the root, which includes C3 and S14, can be skipped. The same applied for the branch of C10 that includes only C10.

When a relevant cached data is found, the written version of the cached data is compared to the written version indicated in the MVL and the data that will be retrieved in response to the read request, is the one with the higher version that is still smaller than the creation version of the requested member.

It is noted that read-only snapshots may have dirty data. When writing data to a writable snapshot that shares the old data with a read-only snapshot and the old data is still in the cache as dirty data (was not yet destaged), instead of overwriting the old data with the new data, the old data is retained in the cache but associated with the at least one read-only snapshot that shares this data and the new cached data is associated with the writable snapshot.

Both mentioned above examples illustrate manners of responding to a read request even if a requested data entity is not cached.

Figure 15:
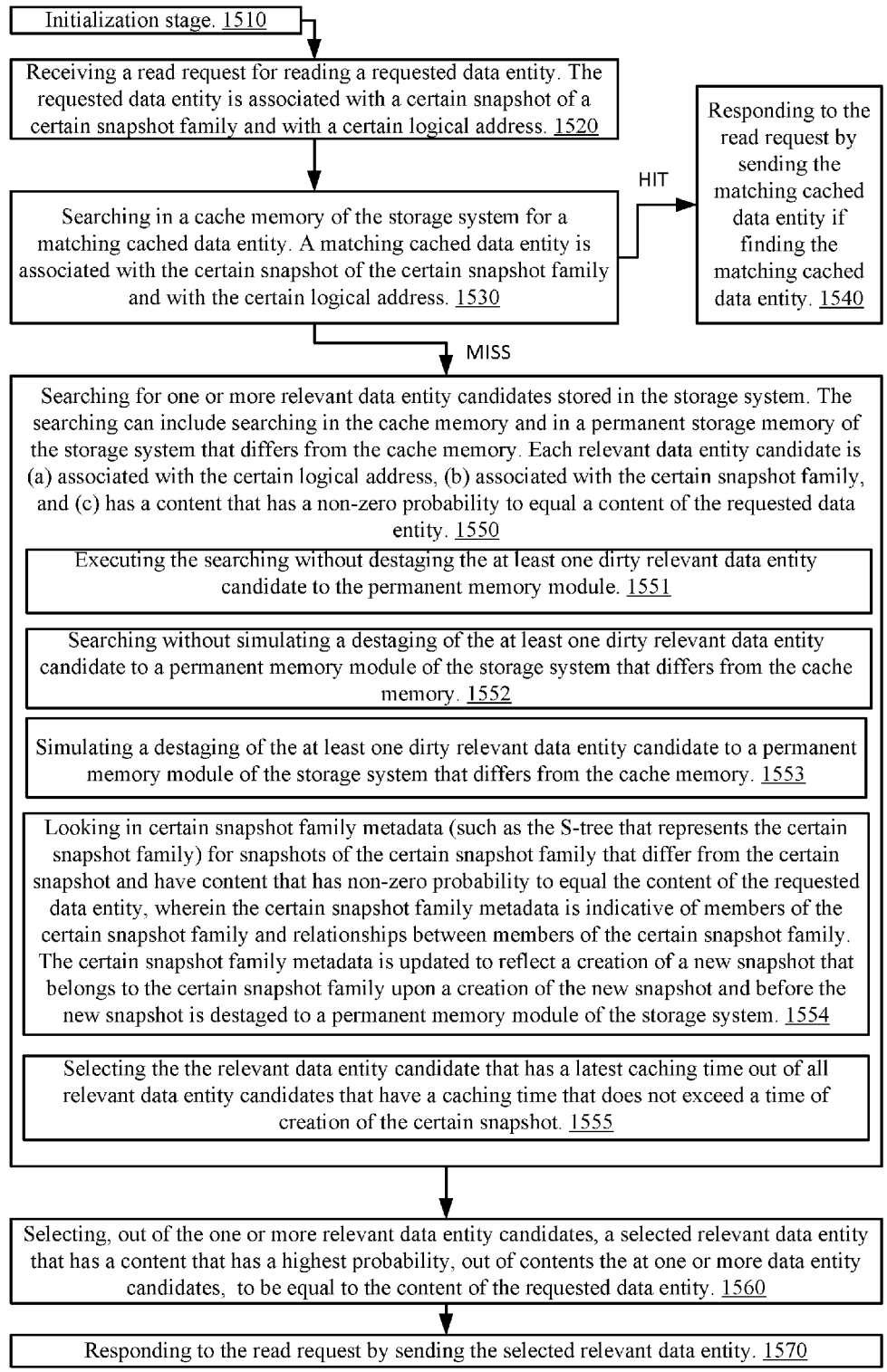
FIG. 15 is generalized flow chart of a method for snapshot family based reading according to an embodiment of the invention.

FIG. 15 illustrates method 1500 according to an embodiment of the invention.

Method 1500 is for snapshot family based reading of data units from a storage system.

Method 1500 may start by initialization stage 1510. The initialization stage may include receiving and/or generating metadata and/or data structures such as S-trees, MVLs, compressed MVLs and the like. Stage 1510 may include calculating metrics such as probabilities of contents of different snapshots of the same snapshot family to be equal to each other.

Stage 1510 may be followed by stage 1520 of receiving a read request for reading a requested data entity. The requested data entity is associated with a certain snapshot of a certain snapshot family and with a certain logical address. The read request may be translated in order to find the certain snapshot family, and the certain snapshot.

Stage 1520 may be followed by stage 1530 of searching in a cache memory of the storage system for a matching cached data entity. A matching cached data entity is associated with the certain snapshot of the certain snapshot family and with the certain logical address.

If the searching for the matching cached data entity is successful (denoted by "HIT") then stage 1530 is followed by stage 1540 of responding to the read request by sending the matching cached data entity if finding the matching cached data entity.

If the searching for the matching cached data entity is unsuccessful (denoted by "MISS") then stage 1530 is followed by stage 1550 of searching for one or more relevant data entity candidates stored in the storage system. The searching can include searching in the cache memory and in a permanent storage memory of the storage system that differs from the cache memory. Data units can be de-staged from the cache memory to the permanent storage memory. Non-limiting examples of permanent storage memories are disk units 104-1-104-n of FIG. 1.

Each relevant data entity candidate (searched during stage 1550) is (a) associated with the certain logical address, (b) associated with the certain snapshot family, and (c) has a content that has a non-zero probability to equal a content of the requested data entity.

Stage 1550 may be followed by stage 1560 of selecting, out of the one or more relevant data entity candidates, a selected relevant data entity that has a content that has a highest probability, out of contents the at one or more data entity candidates, to be equal to the content of the requested data entity.

Stage 1560 may be followed by stage 1570 of responding to the read request by sending the selected relevant data entity.

The one or more relevant data entity candidates may include at least one dirty relevant data entity candidate stored in the cache memory.

Stage 1550 may include at least one of the following:

Executing (1551) the searching without destaging the at least one dirty relevant data entity candidate to the permanent memory module.

Searching without (1552) simulating a destaging of the at least one dirty relevant data entity candidate to a permanent memory module of the storage system that differs from the cache memory.

Simulating (1553) a destaging of the at least one dirty relevant data entity candidate to a permanent memory module of the storage system that differs from the cache memory.

Looking (1554) in certain snapshot family metadata (such as the S-tree that represents the certain snapshot family) for snapshots of the certain snapshot family that differ from the certain snapshot and have content that has non-zero probability to equal the content of the requested data entity, wherein the certain snapshot family metadata is indicative of members of the certain snapshot family and relationships between members of the certain snapshot family. The certain snapshot family metadata is updated to reflect a creation of a new snapshot that belongs to the certain snapshot family upon a creation of the new snapshot and before data of the new snapshot is destaged to a permanent memory module of the storage system.

The searching for a dirty relevant data entity candidate can span over all the members of the certain family snapshot (except the certain snapshot that was not found in the cache during stage 1530), or only over some of the members of the certain snapshot family. For example, the searching can be limited to parents of the certain snapshot, parents of the certain snapshot and/or one or their siblings, members that belong to the same branch (within the S-tree) as the certain snapshot and/or their siblings.

The destaging process can be executed out-of-order. In a sense the de-staging process aligns the mapping metadata regarding to snapshots of a snapshot family. This aligning may be utilized when the searching includes simulating a destaging of the at least one dirty relevant data entity candidate to a permanent memory module of the storage system that differs from the cache memory. The simulating may include allocating a simulation-dedicated physical address to each one of the at least one dirty relevant data entity candidate.

The simulating of the destaging may include updating a logical to physical mapping data structure (such as the MVL) that is associated with the certain snapshot family to reflect the simulating of the destaging wherein the logical to physical mapping data structure is indicative of a mapping between logical addresses and physical addresses; wherein the logical to physical mapping data structure comprises multiple portions; wherein each portion of the logical to physical mapping data structure is dedicated to a logical address range; wherein each portion of the logical to physical mapping data structure comprises physical addresses mapped to the logical address range; and wherein the physical addresses are indicative of physical address ranges allocated in the permanent storage to data associated with one or more snapshot family members. The logical to physical mapping data structure may explicitly associate (in case of a compressed MVL) up to a single snapshot family member per physical address range.

The probability of a content of each member of the certain snapshot family to be equal to the content of the requested data entity is a function of (a) a hierarchical relationship between the member of the certain snapshot family and the certain snapshot, and (b) a timing relationship between a caching time of the content of the member and a time of creation of the certain snapshot. Hierarchical relationships may be reflected in the s-tree and may include (for example), being a parent, being a son, being a sibling and the like.

Stage 1510 may include assigning zero probability to contents of members of the certain snapshot family that were cached at a caching time that followed the time of creation of the certain snapshot.

Stage 1550 may include selecting (1555) of the selected relevant data entity candidate comprises selecting the relevant data entity candidate that has a latest caching time out of all relevant data entity candidates that have a caching time that does not exceed a time of creation of the certain snapshot.

The caching time of each relevant data entity candidate is represented by an identifier of a last snapshot that existed at the caching time of the relevant data entity candidate.

At least one relevant data entity candidate may be associated with a writable snapshot and at least one other relevant data entity candidate may be associated with a read only snapshot.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for a snapshot family based reading of data units from a storage system, the method comprises:
   receiving a read request for reading a requested data entity, the requested data entity is associated with a certain snapshot of a certain snapshot family and with a certain logical address;
   searching in a cache memory of the storage system for a matching cached data entity, wherein a matching cached data entity is associated with the certain snapshot of the certain snapshot family and with the certain logical address;
   responding to the read request by sending the matching cached data entity if finding the matching cached data entity;
   if not finding the matching cached data entity then:
      searching for one or more relevant data entity candidates stored in the storage system;
      wherein each relevant data entity candidate of the one or more relevant data entity candidates is (a) associated with the certain logical address, (b) associated with the certain snapshot family, and (c) has a content that has a non-zero probability to equal a content of the requested data entity;
      selecting, out of the one or more relevant data entity candidates, a selected relevant data entity that has a content that has a highest probability, out of contents of the one or more relevant data entity candidates, to be equal to the content of the requested data entity; and
      responding to the read request by sending the selected relevant data entity.

2. The method according to claim 1 wherein the one or more relevant data entity candidates comprises at least one dirty relevant data entity candidate stored in the cache memory.

3. The method according to claim 2 wherein the searching is executed without destaging the at least one dirty relevant data entity candidate to a permanent memory module of the storage system that differs from the cache memory.

4. The method according to claim 2 wherein the searching comprises looking in a certain snapshot family metadata for snapshots of the certain snapshot family that differ from the certain snapshot and have content that has non-zero probability to equal the content of the requested data entity, wherein the certain snapshot family metadata is indicative of members of the certain snapshot family and relationships between members of the certain snapshot family.

5. The method according to claim 4 wherein the certain snapshot family metadata is updated to reflect a creation of a new snapshot that belongs to the certain snapshot family upon a creation of the new snapshot and before data of the new snapshot is destaged to a permanent memory module of the storage system.

6. The method according to claim 2 wherein each dirty relevant data entity candidate is associated with a snapshot of the certain snapshot family other than the certain snapshot.

7. The method according to claim 2 wherein each dirty relevant data entity candidate is associated with any parent of the certain snapshot.

8. The method according to claim 2 wherein each dirty relevant data entity candidate is associated with a parent of the certain snapshot or with a sibling of a parent of the certain snapshot.

9. The method according to claim 2 wherein the certain snapshot family is represented by a certain tree, wherein the certain snapshot belongs to a certain branch of the certain tree; and wherein each dirty relevant data entity candidate is associated with a member of the certain branch.

10. The method according to claim 2 wherein the searching is executed without simulating a destaging of the at least one dirty relevant data entity candidate to a permanent memory module of the storage system that differs from the cache memory.

11. The method according to claim 2 wherein the searching comprises simulating a destaging of the at least one dirty relevant data entity candidate to a permanent memory module of the storage system that differs from the cache memory.

12. The method according to claim 11 wherein the simulating of the destaging comprises allocating a simulation-dedicated physical address to each one of the at least one dirty relevant data entity candidate.

13. The method according to claim 12 wherein the simulating of the destaging comprise updating a logical to physical mapping data structure associated with the certain snapshot family to reflect the simulating of the destaging wherein the logical to physical mapping data structure is indicative of a mapping between logical addresses and physical addresses; wherein the logical to physical mapping data structure comprises multiple portions; wherein each portion of the logical to physical mapping data structure is dedicated to a logical address range; wherein each portion of the logical to physical mapping data structure comprises physical addresses mapped to the logical address range; and wherein the physical addresses are indicative of physical address ranges allocated to data associated with one or more snapshot family members.

14. The method according to claim 13 wherein the logical to physical mapping data structure explicitly associates up to a single snapshot family member per physical address range.

15. The method according to claim 1 wherein a probability of a content of each member of the certain snapshot family to be equal to the content of the requested data entity is a function of (a) a hierarchical relationship between the member of the certain snapshot family and the certain snapshot, and (b) a timing relationship between a caching time of the content of the member and a time of creation of the certain snapshot.

16. The method according to claim 15 comprising assigning zero probability to contents of members of the certain snapshot family that were cached at a caching time that followed the time of creation of the certain snapshot.

17. The method according to claim 1 wherein the selecting of the selected relevant data entity candidate comprises selecting the relevant data entity candidate that has a latest caching time out of all relevant data entity candidates that have a caching time that does not exceed a time of creation of the certain snapshot.

18. The method according to claim 17 wherein the caching time of each relevant data entity candidate is represented by an identifier of a last snapshot that existed at the caching time of the relevant data entity candidate.

19. The method according to claim 1 wherein at least one relevant data entity candidate is associated with a writable snapshot and at least one other relevant data entity candidate is associated with a read only snapshot.

20. A non-transitory computer readable medium that stores instruction that once executed by a computer causes the computer to execute the stages of:
   receiving a read request for reading a requested data entity, the requested data entity is associated with a certain snapshot of a certain snapshot family and with a certain logical address;
   searching in a cache memory of the storage system for a matching cached data entity, wherein a matching cached data entity is associated with the certain snapshot of the certain snapshot family and with the certain logical address;

responding to the read request by sending the matching cached data entity if finding the matching cached data entity;

if not finding the matching cached data entity then:

searching for one or more relevant data entity candidates stored in the storage system;

wherein each relevant data entity candidate of the one or more relevant data entity candidates is (a) associated with the certain logical address, (b) associated with the certain snapshot family, and (c) has a content that has a non-zero probability to equal a content of the requested data entity;

selecting, out of the one or more relevant data entity candidates, a selected relevant data entity that has a content that has a highest probability, out of contents of the one or more relevant data entity candidates, to be equal to the content of the requested data entity; and responding to the read request by sending the selected relevant data entity.

21. A storage system that comprises a control layer and multiple data storage device, wherein the control layer is arranged to:

receive a read request for reading a requested data entity, the requested data entity is associated with a certain snapshot of a certain snapshot family and with a certain logical address;

search in a cache memory of the storage system for a matching cached data entity, wherein a matching cached data entity is associated with the certain snapshot of the certain snapshot family and with the certain logical address;

respond to the read request by sending the matching cached data entity if finding the matching cached data entity;

wherein if not finding the matching cached data entity then the storage system controller is arranged to:

search for one or more relevant data entity candidates stored in the storage system; wherein each relevant data entity candidate of the one or more relevant data entity candidates is (a) associated with the certain logical address, (b) associated with the certain snapshot family, and (c) has a content that has a non-zero probability to equal a content of the requested data entity;

select, out of the one or more relevant data entity candidates, a selected relevant data entity that has a content that has a highest probability, out of contents of the one or more relevant data entity candidates, to be equal to the content of the requested data entity; and respond to the read request by sending the selected relevant data entity.

* * * * *